US008103758B2

(12) United States Patent
Miura et al.

(10) Patent No.: US 8,103,758 B2
(45) Date of Patent: Jan. 24, 2012

(54) SERVICE PROCESSING APPARATUS, SYSTEM, AND RECORDING MEDIUM

(75) Inventors: Naoki Miura, Tokyo (JP); Masumi Yamashita, Tokyo (JP)

(73) Assignees: The Bank of Tokyo-Mitsubishi UFJ, Ltd., Tokyo (JP); International Business Machines Corp., Armonk, NY (US)

( * ) Notice: Subject to any disclaimer, the term of this patent is extended or adjusted under 35 U.S.C. 154(b) by 136 days.

(21) Appl. No.: 12/560,849

(22) Filed: Sep. 16, 2009

(65) Prior Publication Data

US 2010/0070558 A1    Mar. 18, 2010

(30) Foreign Application Priority Data

Sep. 18, 2008  (JP) ................................. 2008-239773

(51) Int. Cl.
G06F 15/173    (2006.01)
(52) U.S. Cl. ...................................... 709/223; 709/238
(58) Field of Classification Search .................. 709/202, 709/223–224, 220, 238
See application file for complete search history.

(56) References Cited

U.S. PATENT DOCUMENTS

| 5,608,788 | A | * | 3/1997 | Demlow et al. .......... 379/142.07 |
| 5,802,298 | A | * | 9/1998 | Imai et al. ..................... 709/217 |
| 6,173,049 | B1 | * | 1/2001 | Malik ....................... 379/207.11 |
| 2003/0005456 | A1 | * | 1/2003 | Naganuma et al. ............ 709/219 |
| 2005/0102353 | A1 | * | 5/2005 | Murphy et al. ................ 709/203 |
| 2005/0267772 | A1 | * | 12/2005 | Nielsen et al. ..................... 705/1 |
| 2006/0168220 | A1 | * | 7/2006 | Katoh et al. ................... 709/225 |
| 2007/0226705 | A1 | * | 9/2007 | Lomet ........................... 717/133 |
| 2009/0077247 | A1 | * | 3/2009 | Bouazizi et al. .............. 709/229 |

FOREIGN PATENT DOCUMENTS

| JP | A-9-62526 | 3/1997 |
| JP | A-2007-304951 | 11/2007 |

* cited by examiner

Primary Examiner — Philip B Tran
(74) Attorney, Agent, or Firm — Oliff & Berridge, PLC

(57) ABSTRACT

A service processing apparatus that is realized by a computer is provided. A service ID generating/adding component of the service processing apparatus generates a service ID including a call origin ID and a call destination ID, in each of which an ID element is set, and adds the generated service ID to a service request transmitted when no upper service processing apparatus to the own apparatus exists, and, when an upper service processing apparatus to the own apparatus exists, generates a service ID including a call origin ID in which is set an ID element set as the call destination ID in a service ID added to a service request received from the upper service processing apparatus and a call destination ID in which is set an ID element and adds the generated service ID to the service request.

7 Claims, 23 Drawing Sheets

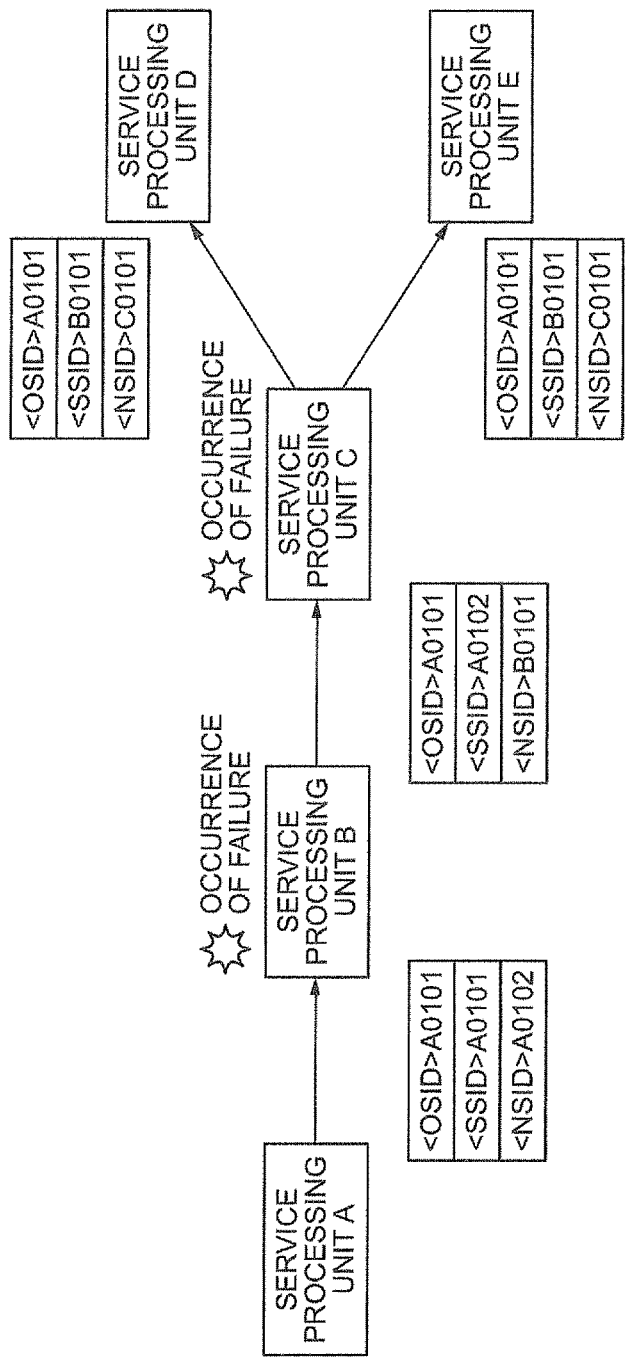

SERVICE PROCESSING APPARATUS, SYSTEM, AND RECORDING MEDIUM

CROSS-REFERENCE TO RELATED APPLICATION

This application claims priority under 35 USC 119 from Japanese Patent Application No. 2008-239773 filed on Sep. 18, 2008, the disclosure of which is incorporated by reference herein.

BACKGROUND OF THE INVENTION

1. Field of the Invention

The present invention relates to a service processing apparatus, a system, a program, and a recording medium. In particular, the invention relates to a service processing apparatus that executes a requested service, a service processing system that includes plural service processing apparatuses, a service processing program that causes a computer to function as the service processing apparatus, and a recording medium that has the service processing program stored therein.

2. Description of the Related Art

In a computer system where plural service requests are input and processes according to the individual input service requests are performed, in order to confirm whether the individual service requests are normally processed or the processes corresponding to the abnormally processed service requests are executed again during generation of a failure, identification information needs to be added to each service request to identify each service request. As a related technique, Japanese Patent Application Laid-Open (JP-A) No. 9-62526 discloses a technique that causes a PALIB (identifier adding component) as a client-side communication mechanism to add an identification (ID), which corresponds to a combination of three kinds of identifiers functioning as an ID to secure uniqueness of RPC (Remote Procedure Call) requests, to all RPC messages to be transmitted to a server, thereby transmitting the ID and the RPC message together.

In recent years, a service oriented architecture (SOA) that is a designing method to construct a large-scale system as a set of "services" has been developed. As a related technique, JP-A No. 2007-304951 discloses the following technique. According to this technique, in order to add or exchange services using a variation in the services in an SOA environment as a trigger and modify a business process after deletion, information indicating a relationship between services used by the business process, that is, a business process ID, a service ID associated with the business process ID, and a subsequent service ID indicating a service executed after a service indicated by the service ID is executed are set and managed in a business process service transition information table.

In general, when a process is performed using identification information in a computer system, it is needed to prevent identification information from overlapping and secure uniqueness of the identification information in the computer system. The prevention from overlapping the identification information may be realized by performing a numbering process accompanied with exclusive control. Specifically, all of identification information that is used in a specific database (DB) in the computer system is registered, the DB is logged when new identification information is numbered, non-registration information is set as new identification information in the DB, and the logging of the DB is released after the set new identification information is registered in the DB. Even in regards to the techniques that are disclosed in JP-A Nos. 9-62526 and 2007-304951, uniqueness of the ID needs to be secured. Therefore, although the securing of the uniqueness of the ID is not clearly described, it is assumed that the ID is numbered by a numbering process accompanied with exclusive control or a process similar to the numbering process.

However, in the computer system that processes plural service requests, when a service ID as identification information is added to each service request and numbering of the service ID is performed by the numbering process accompanied with exclusive control, an access is concentrated on the DB where the service ID is registered, and the numbering process accompanied with exclusive control becomes a bottleneck of a process in the computer system. As a result, performance of the computer system may be significantly lowered.

In particular, in the computer system that is constructed by applying the SOA, if programs are divided in functional units and a program for realizing a portion of the individual divided functions is already developed, the computer system is constructed by appropriating the developed program. Therefore, programs (service processing units) for realizing different functions are connected with multiple stages, and the service processing units of the multiple stages cooperatively process the individual service requests input to the computer system. In this configuration, when a failure, such as a communication error, is generated in the computer system, in the specific service processing unit that is located close to a failure generation place, the process is interrupted due to the generation of the failure, and plural information of the service request that becomes a process non-completion state is accumulated. In order to perform a control operation of restarting the process corresponding to the service request becoming the process non-completion state at timing when the failure is resolved, it is needed to grasp a process history of the services corresponding to the individual service requests (whether the information of the service request reaches the specific service processing unit through any path in the computer system (through any service processing unit), based on the information of the individual service request of the process non-completion state accumulated in the specific service processing unit.

However, as in the technique disclosed in JP-A No. 9-62526, when a different ID is simply added to the information of the individual service request, the process history of the individual service may not be determined, even though referring to the ID added to the information of the individual service request of the process non-completion state accumulated in the specific service processing unit. For this reason, in the configuration where the service processing units are connected with the multiple stages, it is difficult to grasp the process history with respect to the service request where the process is interrupted according to the generation of the failure. Further, the individual service processing unit may be constructed using the management table of the technique disclosed in JP-A No. 2007-304951, such that, whenever the individual service processing unit receives the information of the service request, information related to the process history of the service corresponding to the received information is simply registered in a single management table. In this case, however, an access is concentrated from the individual service processing unit of the computer system to the single management table, which results in significantly lowering performance of the computer system.

SUMMARY OF THE INVENTION

The present invention has been made in view of the above-described problems, and it is an object of the invention to provide a service processing apparatus that may grasp a process history of a requested service at the time of generation of a failure while suppressing performance from being lowered, a service processing system, a service processing program, and a recording medium.

A first aspect of the invention is a service processing apparatus that is realized by a computer and forms a service processing system, and transmits and receives information, with at least one other service processing apparatus, the service processing apparatus comprising: a processing component that processes an own service corresponding to a service for which execution is requested when execution of the service is requested, and transmits a service request, which requests a lower service processing apparatus to execute a lower service, to the lower service processing apparatus, when the lower service needs to be executed by the lower service processing apparatus; an ID element generating component that generates an ID element including a unique ID in which a different ID is set for each service processing apparatus and a request ID in which a different ID is set for each service request; and a service ID generating/adding component that generates a service ID including a call origin ID and a call destination ID, in each of which the ID element generated by the ID element generating component is set, and adds the generated service ID to a service request transmitted by the processing component when no upper service processing apparatus to the own apparatus exists, and, when an upper service processing apparatus to the own apparatus exists, generates a service ID including a call origin ID in which is set an ID element set as the call destination ID in a service ID added to a service request received from the upper service processing apparatus and a call destination ID in which is set an ID element generated by the ID element generating component and adds the generated service ID to the service request transmitted by the processing component.

In a service processing system according to a second aspect of the invention, the plural service processing apparatuses according to the first aspect are provided to exchange information with each other.

A third aspect of the invention is a storage medium readable by a computer, the storage medium storing a program of instructions executable by the computer to perform a function as a service processing apparatus forming a service processing system, and transmits and receives information, with at least one other service processing apparatus, the function comprising: a processing component that processes an own service corresponding to a service for which execution is requested, when execution of the service is requested, and transmits a service request, which requests a lower service processing apparatus to execute a lower service, to the lower service processing apparatus, when the lower service needs to be executed by the lower service processing apparatus; an ID element generating component that generates an ID element including a unique ID in which a different ID is set for each service processing apparatus and a request ID in which a different ID is set for each service request; and a service ID generating/adding component that generates a service ID including a call origin ID and a call destination ID in which the ID element generated by the ID element generating component is set and adds the generated service ID to a service request transmitted by the processing component, when no upper service processing apparatus to the own apparatus exists, and when an upper service processing apparatus to the own apparatus exists, generates a service ID including a call origin ID in which is set an ID element set as the call destination ID in a service ID added to a service request received from the upper service processing apparatus and a call destination ID in which is set an ID element generated by the ID element generating component and adds the generated service ID to the service request transmitted by the processing component.

BRIEF DESCRIPTION OF THE DRAWINGS

FIG. 17 is a diagram illustrating validity of an OSID in a service ID;

DETAILED DESCRIPTION OF THE INVENTION

Figure 1:
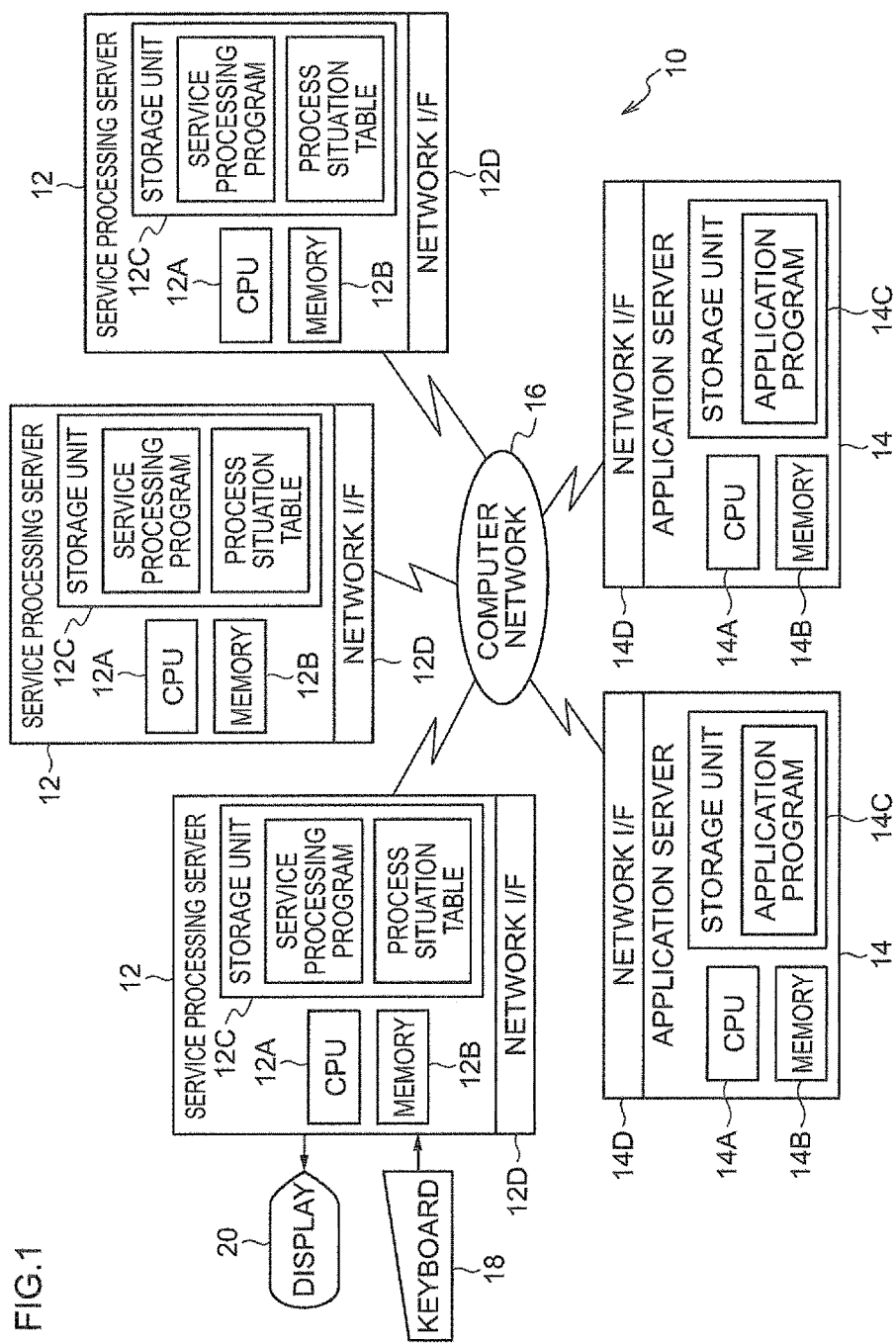
FIG. 1 is a schematic block diagram illustrating a hardware configuration of a service processing system according to this exemplary embodiment.

Hereinafter, exemplary embodiments of the present invention will be described with reference to the accompanying drawings. FIG. 1 illustrates a service processing system 10 according to this exemplary embodiment. The service processing system 10 is configured by connecting plural service processing servers 12 and plural application servers 14 through a computer network 16.

Each of the application servers 14 includes a CPU 14A, a memory 14B composed of a ROM or a RAM, a storage unit 14C composed of a hard disk drive (HDD), and a network interface (I/F) unit 14D, and is connected to a computer network 16 through the network I/F unit 14D. Each of the application servers 14 is a computer that constitutes a portion of another existing computer system (as another existing computer system, for example, a backbone system of a banking facility (depositing system or other package system) may be exemplified). In the storage unit 14C of each application server 14, a different application program for causing a predetermined service to be provided to another existing computer system is installed.

Meanwhile, each of the service processing servers 12 includes a CPU 12A, a memory 12B composed of a ROM or a RAM, a storage unit 12C composed of an HDD, and a network interface (I/F) unit 12D, and is connected to the computer network 16 through the network I/F unit 12D. Further, in the storage unit 12D, a service processing program is installed, and a process situation table (to be described in detail below) is stored. The service processing program corresponds to a program in the invention, and the service processing server 12 causes the CPU 12A to execute the service processing program, and functions as a service processing unit (service processing apparatus in the invention) to be described in detail below.

FIG. 1 illustrates an aspect of when a keyboard 18 where an operator may input any information and a display 20 where the any information may be displayed are connected to each other, as an example of an apparatus enabling a request for the service processing server 12 functioning as the uppermost service processing unit among the plural service processing servers 12 to execute a service. In this aspect, the operator operates the keyboard 18, and an execution of a service is requested from the operator to the uppermost service processing unit. Then, a process result of the service where an execution is requested is displayed on the display 20 and visually recognized by the operator. However, the invention is not limited to the aspect illustrated in FIG. 1, and the service processing server 12 that functions as the uppermost service processing unit may be connected to the apparatus that requests the uppermost service processing unit to execute a service. As the apparatus that request to execute the service, for example, a controller of a batch job, another computer system, the Internet, or a web server may be exemplified. In this aspect, the execution of the service is directly requested from the apparatus to the uppermost service processing unit without the operation from the operator, and the process result of the service where the execution is requested is directly notified from the uppermost service processing unit to the apparatus.

Figure 2:
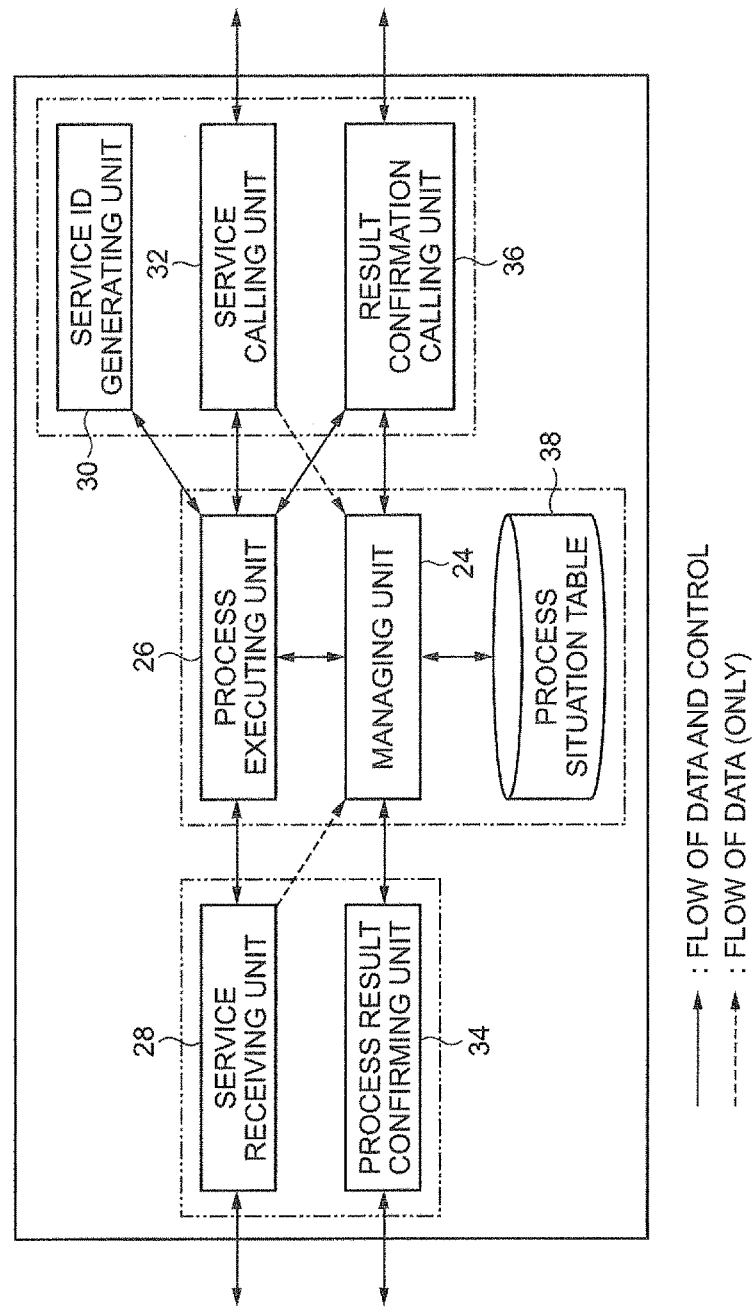
FIG. 2 is a diagram illustrating a SOA reference model.

Next, the function of this exemplary embodiment will be described. The service processing system 10 according to this exemplary embodiment is constructed by applying an SOA, dividing services to be provided in functional units, and appropriating the developed function among the individual divided functions (corresponds to a service provided by each application server 14 connected to the service processing system 10, in this exemplary embodiment). In the service processing system 10, the service processing servers 12 that realize different functions (service processing units realized by the service processing servers 12) are coupled with multiple stages by loosely coupling, and the service processing units of the plural stages cooperatively process the individual service requests that are input to the service processing system 10. Further, in the service processing system 10 according to this exemplary embodiment, the service processing program that is installed in the storage unit 12C of the individual service processing server 12 is developed, such that the service processing unit realized by the individual service processing server 12 is configured based on the reference model illustrated in FIG. 2.

Hereinafter, the reference model of the service processing unit will be first described. In the reference model, the service processing unit is divided into individual functional blocks of a managing unit 24, a process executing unit 26, a service receiving unit 28, a service ID generating unit 30, a service calling unit 32, a process result confirming unit 34, and a result confirmation calling unit 36 and defines functions for the functional blocks, respectively, thereby the functions to be included in the service processing unit to secure integrity of data, when a failure is generated in the service processing system 10 is defined.

In the reference model of the service processing unit, the managing unit 24 includes a storage unit that stores the process situation table 38 (in this case, the storage unit indicates a storage area that is allocated to the managing unit 24 to store the process situation table 38, among the storage areas of the storage unit 12C). The managing unit 24 associates a process result of a service (an own service and a lower service corresponding to the service) where an execution is requested with respect to the service processing unit with a service ID used to identify the service, and manages the process result and the service ID in the process situation table 38. The managing unit 24 includes a function of requesting the result confirmation calling unit 36 to confirm the process result of the lower service when it is needed to confirm the process result of the lower service. Further, the processing executing unit 26 has the following function. If the service ID is notified and the execution of the service is requested, when there is an own service that corresponds to the execution requested service, the process executing unit 26 executes a process of the own service. In addition, when there is a lower service that corresponds to the execution requested service, the processing executing unit 26 generates a service ID by the service ID generating unit 30 and requests the service calling unit 32 to execute the lower service.

Further, the service receiving unit 28 is provided, when an upper service processing unit exists. If a request of a service where a service ID is added is received from the upper service processing unit and an execution of the service is requested, the service receiving unit 28 requests the process executing unit 26 to execute the execution requested service, and transmits a response to the upper service processing unit, after the process is completed. Further, the service ID generating unit 30 is provided when a lower service processing unit exists, and generates a service ID having uniqueness according to the request from the process executing unit 26. Further, the service calling unit 32 is provided as many as the lower service processing unit, when the lower service processing unit exists, and transmits a service request where a service ID of the lower service is added to the lower service processing unit according to the request from the process executing unit 26.

Further, the process result confirming unit 34 is provided when the upper service processing unit exists. If a process result confirmation request having an added service ID is received from the upper service processing unit and a confirmation of the process result of the service is requested, the process result confirming unit 34 confirms the process result of the service where the confirmation of the process result is requested using the service ID by the managing unit 24. If the confirmation of the process result is completed, the process result confirming unit 34 notifies the service processing unit of the confirmed process result. Further, the result confirmation calling unit 36 is provided as many as the lower service processing unit, when the lower service processing unit exists. The result confirmation calling unit 36 transmits a process result confirmation request where a service ID of a lower service of a confirmation object is added to the lower service processing unit.

Next, a general process sequence in the service processing unit, which is realized when the individual functional blocks (the managing unit 24, the process executing unit 26, the service receiving unit 28, the service ID generating unit 30, the service calling unit 32, the process result confirming unit 34, and the result confirmation calling unit 36) of the service processing unit include the above-described functions, will be described.

Figure 3:
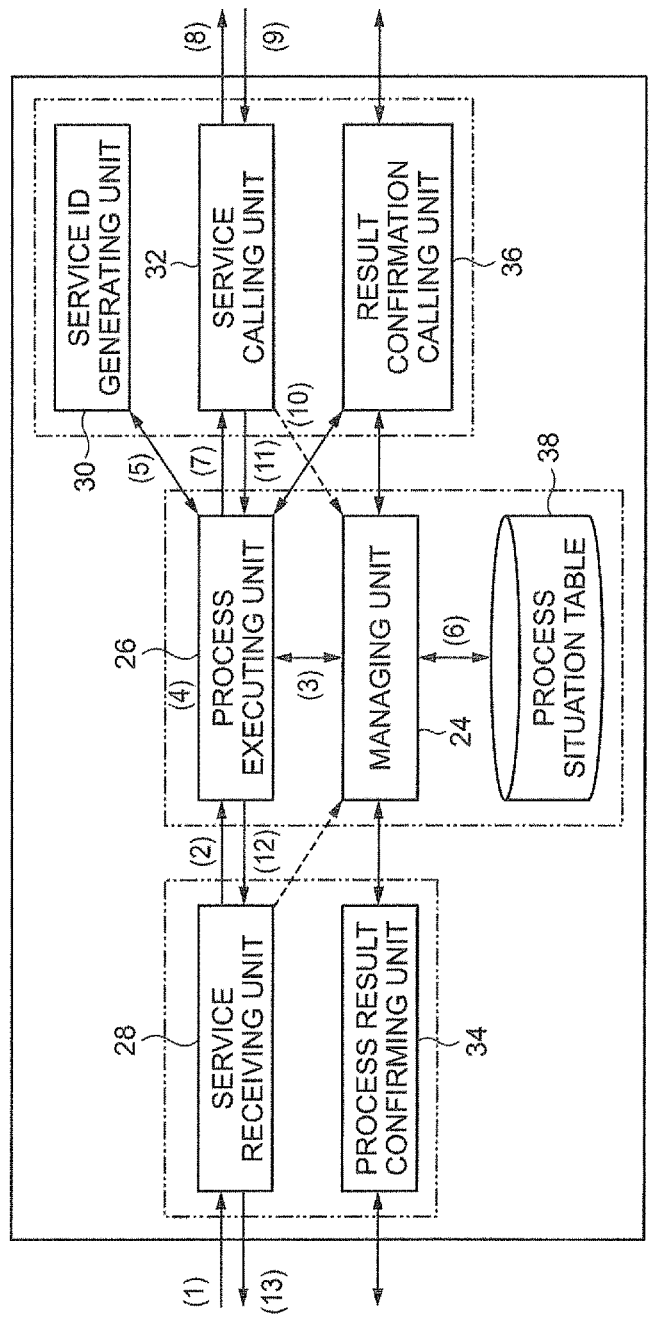
FIG. 3 is a conceptual diagram illustrating a process sequence of a service processing unit at the time of receiving a service request.

When the service processing unit whose upper service processing unit exists receives a service request from the upper service processing unit, in the service processing unit that has received the service request, the individual functional blocks are cooperatively operated, and a process is performed according to the process sequence illustrated in FIG. 3. That is, when receiving a service request where a service ID is added from the upper service processing unit (refer to (1)), the service receiving unit 28 notifies the process executing unit 26 of the service ID and requests to execute the service (refer to (2)). The process executing unit 26 confirms the process result of the execution requested service by the managing unit 24 (refer to (3)). In addition, if the confirmed process result is "process completion", the processing executing unit 26 immediately returns a response to the service receiving unit 28 (refer to (12)). However, when the confirmed process result is "non-completion" and an own service corresponding to the execution requested service exists, the process executing unit 26 executes the process of the own service, and associates the process result and the service ID with each other and records the association result in the process situation table 38 (refer to (4)).

Further, when a lower service corresponding to the execution requested service exists and the lower service is not "process completion", the process executing unit 26 generates a service ID of the lower service by the service ID generating unit 30 (refer to (5)), and records the generated service ID of the lower service in the process situation table 38 (refer to (6)). The process executing unit 26 notifies the service calling unit 32 of the service ID of the lower service and requests to execute the lower service (refer to (7)). Thereby, the service calling unit 32 transmits a service request where the notified service ID of the lower service is added to the lower service processing unit (refer to (8)). Further, when receiving the response from the lower service processing unit (refer to (9)), the service calling unit 32 records a process result of the lower service notified by the received response in the process situation table 38 (refer to (10)), and notifies the process executing unit 26 of the process completion (refer to (11)). After receiving the notification, the process executing unit 26 notifies the service receiving unit 28 of the process result (refer to (12)), and the service receiving unit 28 transmits the response to the upper service processing unit to notify the process result (refer to (13)).

Figure 4:
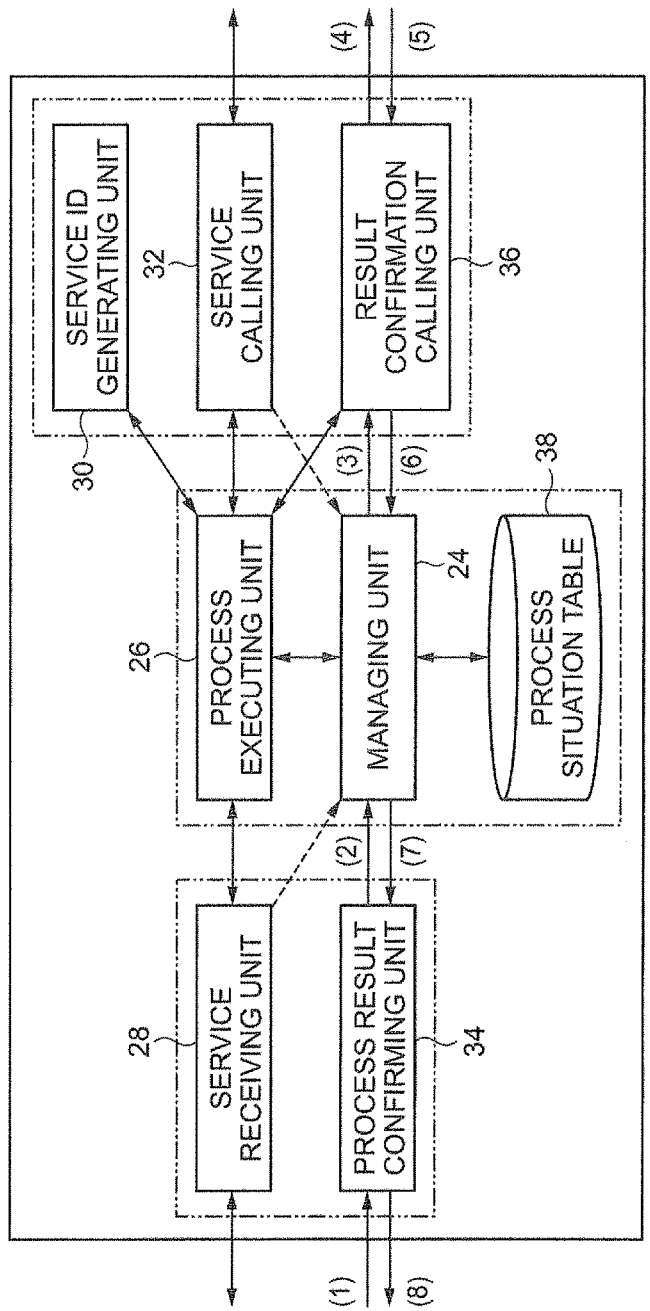
FIG. 4 is a conceptual diagram illustrating a process sequence of a service processing unit at the time of receiving a process result confirmation request.

Further, when the service processing unit whose upper service processing unit exists receives a process result confirmation request from the upper service processing unit, in the service processing unit that has received the service request, the individual functional blocks are cooperatively operated, and a process is performed according to the process sequence illustrated in FIG. 4. That is, when receiving the process result confirmation request from the upper service processing unit (refer to (1)), the process result confirming unit 34 confirms a process result of each service corresponding to the service where the confirmation of the process result is requested by the received process result confirmation request, by the managing unit 24 (refer to (2)). In addition, when a lower service whose process result is "unclear" does not exist in each service corresponding to the service, the process result confirming unit 34 immediately returns the response to the upper service processing unit (refer to (8)). However, when the lower service of which process result is "unclear" exists, the process result confirming unit 34 requests the corresponding result confirmation calling unit 36 to confirm the process result of the lower service (refer to (3)).

When the confirmation of the process result of the lower service is requested, the result confirmation calling unit 36 transmits the process result confirmation request to the lower service processing unit (refer to (4)). Further, when receiving a response notifying the process result of the lower service from the lower service processing unit (refer to (5)), the result confirmation calling unit 36 records the notified process result of the lower service in the process situation table 38 (refer to (6)), and the managing unit 24 notifies the result confirmation calling unit 36 of the process result confirmed by the process result confirming unit 34 (refer to (7)). After receiving the notification, the process result confirming unit 34 transmits a response notifying a process result including the notified process result of the lower service to the upper service processing unit (refer to (8)).

Figure 5:
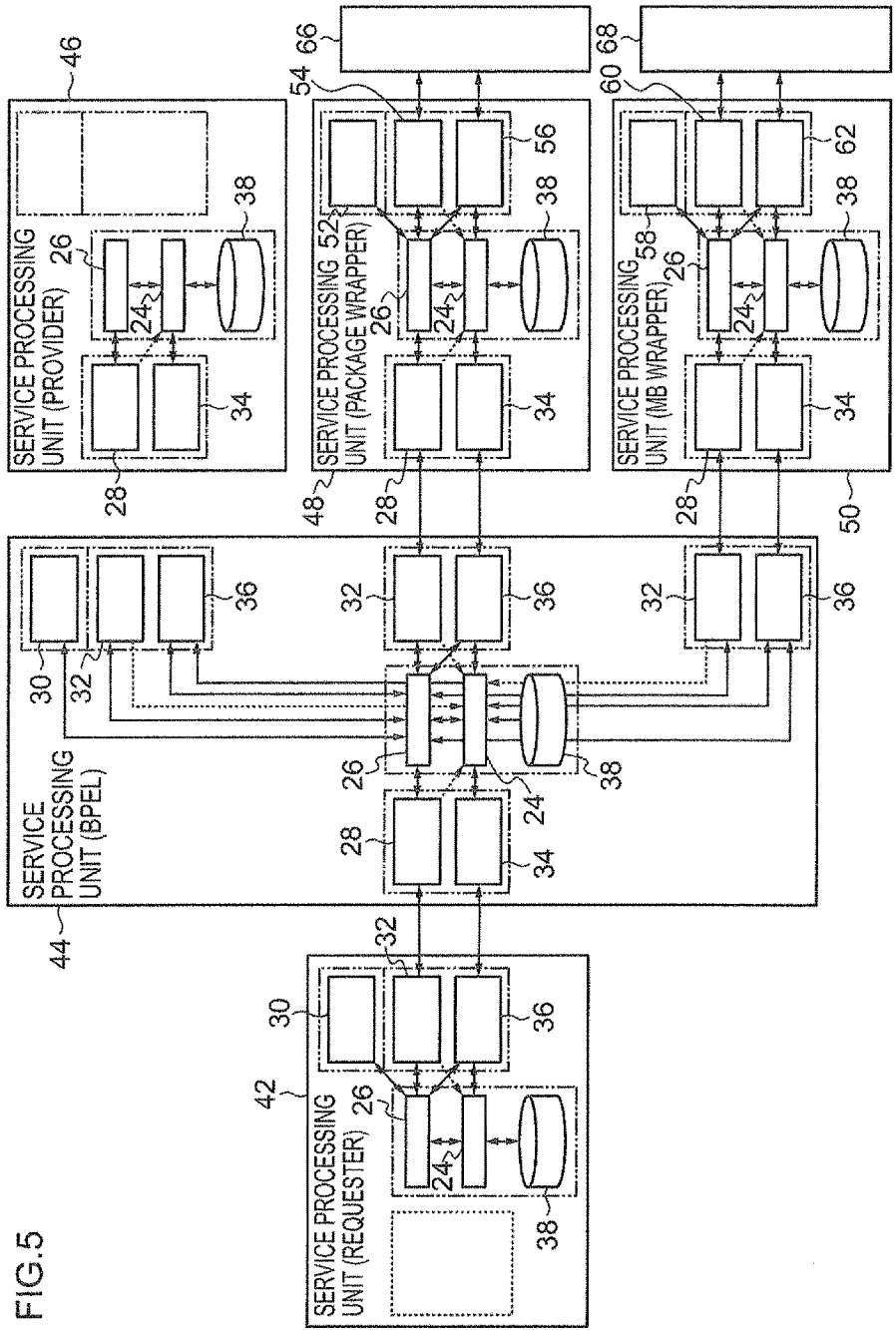
FIG. 5 is a functional block diagram illustrating a software configuration of a service processing system according to this exemplary embodiment.
Figure 6:
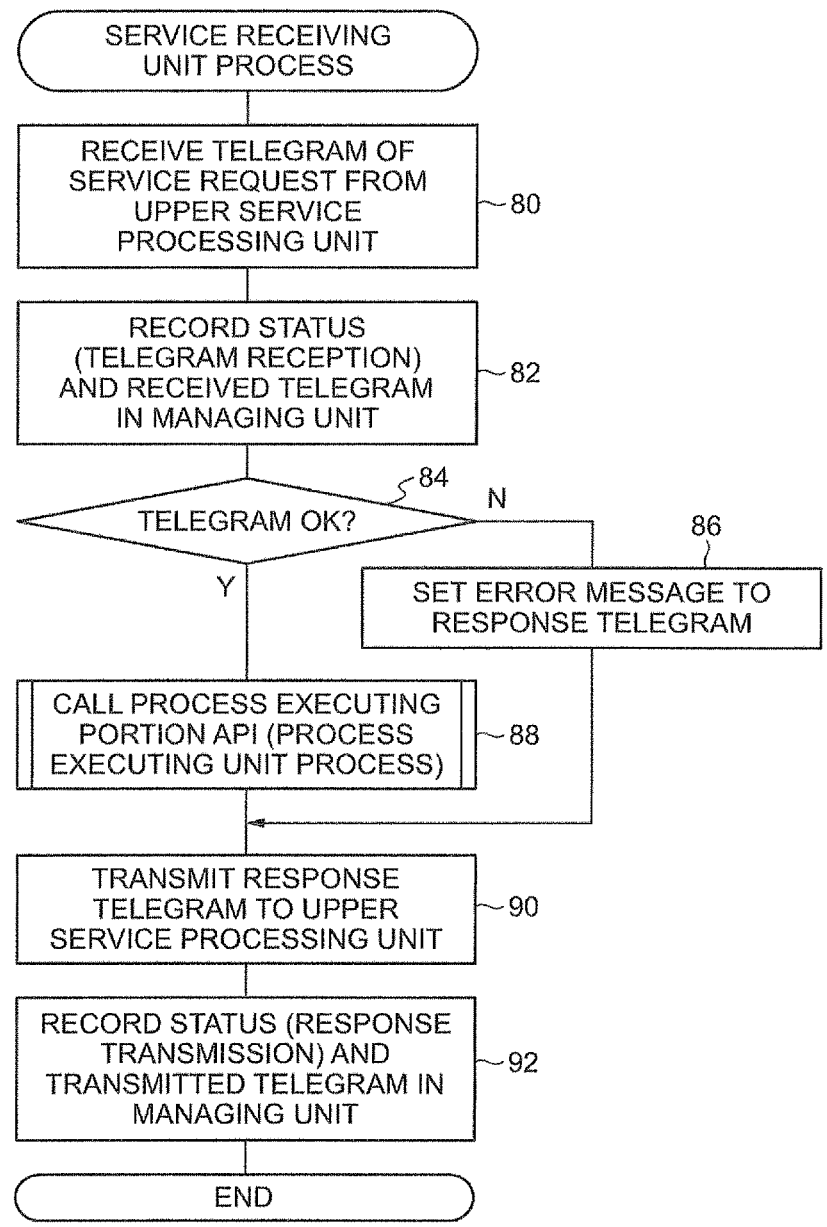
FIG. 6 is a flowchart illustrating a service receiving unit process.

Next, an example of a software configuration of the service processing system 10 that is constructed based on the reference model of the service processing unit will be described with reference to FIG. 5. As illustrated in FIG. 5, in the service processing system 10 according to this exemplary embodiment, five service processing units are divided into three layers (three stages), the three service processing units of the third layer (third stage) are connected to one service processing unit of the second layer (second stage), and one service processing unit of the second layer (second stage) is connected to one service processing unit of the first layer (first stage).

Since there is no upper service processing unit than the service processing unit of the first layer (uppermost layer), the service receiving unit 28 and the process result confirming unit 34 are omitted with respect to the reference model of the service processing unit. Hereinafter, the uppermost service processing unit is called a "requester 42", for the convenience of explanation. When a keyboard 18 and a display 20 are connected to the service processing server 12 that functions as the requester 42, the requester 42 transmits a service request or a process result confirmation request to the lower service processing unit according to an instruction input when an operator operates the keyboard 18, and performs a process of displaying a process result on the display 20, based on the response from the lower service processing unit. When an apparatus (for example, a controller of a patch job, other computer system, the Internet, or a web server) that requests to execute a service is connected to the service processing server 12 functioning as the requester 42, the service processing server receives the request from the apparatus by the requester 42, transmits a service request or a process result confirmation request to the lower service processing unit according to the received request, and performs a process of notifying the apparatus of the process result, based on the response from the lower service processing unit.

Further, since the three lower service processing units exist in the service processing unit of the second layer, three pairs of the service calling units 32 and the result confirmation calling units 36 are provided. In this exemplary embodiment, a program of the service processing unit of the second layer is developed as a program that is operated on a platform of a business process execution language (BPEL) called a BPEL engine. In the storage unit 12C of the service processing server 12 that functions as the service processing unit of the second layer, a predetermined program functioning as the platform is also installed. Hereinafter, the service processing unit of the second layer is called a "BPEL 44", for the convenience of explanation. The BPEL 44 performs a process of transmitting a service request or a process result confirmation request to the lower service processing unit or securing integrity of data when a failure is generated, in accordance with the service request or the process result confirmation request received from the requester 42.

Further, in the third layer, as the three service processing units, a service processing unit that is not connected to another existing computer system (application server 14 of another existing computer system), a service processing unit that is connected to a package system 66 (application server 14 of the package system) functioning as another existing computer system, and a service processing unit that is connected to a depositing system 68 (application server 14 of the depositing system) functioning as another existing computer system exist. Since the lower service processing units do not exist in these service processing units, the service calling unit 32 and the result confirmation calling unit 36 are omitted with respect to the reference model of the service processing unit.

Among the three service processing units of the third layer, the service processing unit that is not connected to the existing system is a service processing unit where a constant service is realized by only the process executed by the process executing unit 26. Hereinafter, the service processing unit is called a "provider 46", for the convenience of explanation.

Further, among the three service processing units of the third layer, in the service processing unit that is connected to the package system 66 (application server 14 of the package system), as functional blocks functioning as an interface between the service processing system 10 and the package system 66, an ID converting unit 52 that numbers a unique ID of the package system 66 as an ID replacing the service ID in the service processing system 10, and a package calling unit 54 and a result confirmation calling unit 56, each of which includes a function of mutually converting a data format and communicates with the package system 66 to execute a service or confirm a process result are provided. Hereinafter, the service processing unit is called a "package wrapper 48", for the convenience of explanation.

Further, among the three service processing units of the third layer, in the service processing unit that is connected to the depositing system 68 (application server 14 of the depositing system), as functional blocks functioning as an interface between the service processing system 10 and the depositing system 68, a terminal managing unit 58 that numbers a terminal number corresponding to a unique ID of the depositing system 68 as an ID replacing the service ID in the service processing system 10, and an MB communicating unit 60 and a financial record inquiring unit 62, each of which includes a function of mutually converting a data format and communicates with the depositing system 68 to execute a service or confirm the processing result (inquire a financial record) are provided. Hereinafter, the service processing unit is called a "MB wrapper 50", for the convenience of explanation.

In this exemplary embodiment, for the convenience of explanation, the service that is provided by the provider 46 among the provider 46, the package wrapper 48, and the MB wrapper 50 as the service processing units of the third layer of the service processing system 10, and the service that is provided by the MB wrapper 50 (and the depositing system 68) have idempotence, however, the service that is provided by the package wrapper 48 (and the package system 66) does not have idempotence. The service having the idempotence is a service where the same result is obtained even though the service is executed plural times, and may be exemplified by a service that reads data stored in a constant area of a database (DB) and outputs the data. Further, the service no having the idempotence (service of non-idempotent) is a service where a different result is obtained whenever the service is executed, and may be exemplified by a service that increments a numerical value stored in a constant area of the DB whenever the service is executed and outputs the result.

In FIG. 3, the service ID generating unit 30 that is provided in the individual service processing units (the requester 42 and the BPEL 44) of which lower service processing units exist corresponds to an ID element generating component and a service ID generating/adding component according to the invention.

Next, a process in the individual functional blocks of the service processing unit will be described with reference to the flowcharts illustrated in FIGS. 6 to 15. The service processing unit of which upper service processing unit exists receives a service request requesting to execute a service and a process result confirmation request requesting a confirmation of the process result of the execution requested service from the upper service processing unit. However, in the service processing unit whose upper service processing unit exists, the service receiving unit 28 is provided. The service receiving unit 28 performs the service receiving unit process illustrated in FIG. 6, when receiving the service request from the upper service processing unit.

During the service receiving unit process, first, the service receiving unit receives a telegram of the service request from the upper service processing unit in step 80. Next, in step 82, the service receiving unit stores status information indicating that the telegram of the service request is received from the upper service processing unit and the received telegram in the process situation table 38 of the managing unit 24. Further, a service ID of the execution requested service is added to the received telegram, and the service ID is also stored in the process situation table 38 by the process. Next, in step 84, the service receiving unit checks contents of the received telegram and determines whether the contents of the received telegram are appropriate. When the determination is negative, the procedure proceeds to step 86, an error message is set to a telegram of a response to be transmitted to the upper service processing unit, and the procedure proceeds to step 90.

Meanwhile, when the contents of the received telegram are appropriate, the determination of step 84 becomes affirmative, the procedure proceeds to step 88, an API of the process executing unit 26 is called using the service ID added to the telegram of the received service request as an argument, and an execution of the service is requested. Thereby, the process executing unit process (to be described in detail below) is executed by the process executing unit 26. When the process executing unit process is completed by the process executing unit 26 and the process result of the execution requested service is notified, the process procedure proceeds to step 90, after the notified process result is set to the telegram of the response to be transmitted to the upper service processing unit. In step 90, the telegram of the response that is generated in step 86 or 88 is transmitted to the upper service processing unit. In step 92, status information indicating that the telegram of the response is transmitted to the upper service processing unit and the transmitted response telegram are stored in the process situation table 38 of the managing unit 24, and the service receiving unit process is completed.

Next, the process executing unit process that is preformed by the process executing unit 26 when the execution of the service is requested will be described. The contents of the process executing unit process are vary different according to the conditions, such as whether the upper service processing unit exists or not, whether the lower service processing unit exists or not and the number of lower service processing units, whether idempotence of the lower service by the lower service processing unit exists or not, whether a call requesting to execute a service is a call (hereinafter, referred to as idempotent call) using a virtual idempotent function (function allowing the same result to be obtained whenever the execution of the service is requested, regardless of whether an actual service has idempotence or not) or a call not using the virtual idempotent (hereinafter, referred to as non-idempotent call), and whether or not to execute a compensating process. For this reason, a representative process in the process executing unit 16 of the BPEL 44 as an example of the process executing unit process will be described with reference to FIGS. 7 to 10. In the process executing unit process illustrated in FIGS. 7 to 10, it is assumed that the execution of the service needing the execution of the lower service by each of the provider 46, the package wrapper 48, and the MB wrapper 50 is requested. When the process executing unit 26 is called, an idempotent flag (FLG) as an argument is delivered to the process executing unit 26, and an idempotent call or a non-idempotent call are discriminated according to whether the idempotent flag has a value of 1 or 0.

Figure 7:
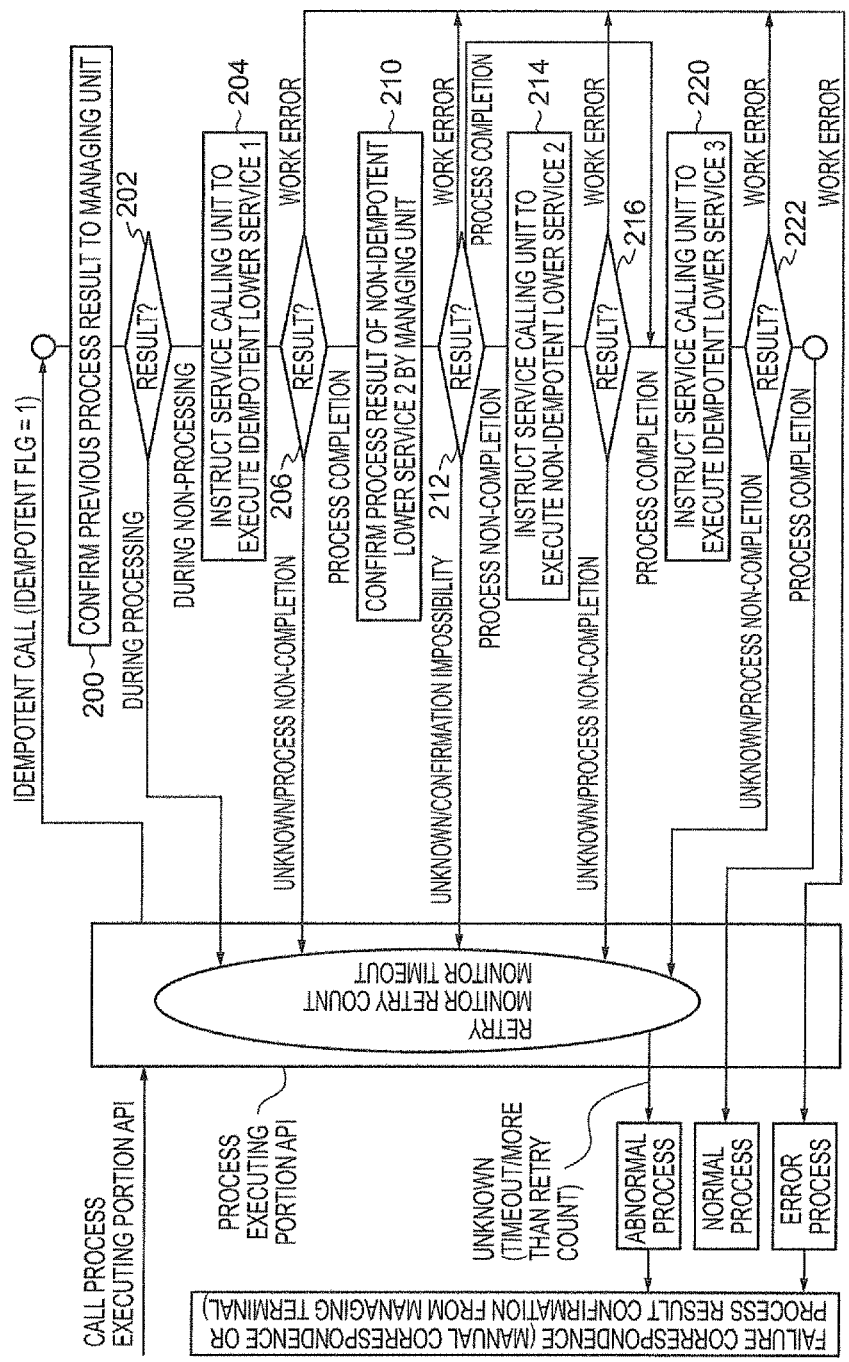
FIG. 7 is a flowchart illustrating an example (idempotent call and non-compensation) of a process executing unit process.

The process executing unit process illustrated in FIG. 7 is an example of the process executing unit process under the condition where the execution of the service is requested with respect to the process executing unit 26 of the BPEL 44 by the idempotent call, and the compensating process is not executed by the process executing unit 26. In the aspect illustrated in FIG. 7, a program of the process executing unit 26 is divided into a process executing portion API and a work program. The process executing portion API is a program that executes a standardizing process, among the processes for realizing the function of the process executing unit 26. In the example of FIG. 7, processes of monitoring timeout of a response from the lower service processing unit (the provider 46, the package wrapper 48, and the MB wrapper 50 in this example) (monitoring whether a response non-reception state after transmitting a service request is continued for a predetermined time or more), retrying a service request to the lower service processing unit (for example, retransmission of a service request when a process result is "unclear"), and monitoring a retry count (processing the operation as "abnormal", when a transmission count of the service request reaches a predetermined count) are performed by the processing executing portion API.

As such, even when the program of the process executing unit is divided into the process executing portion API and the work program, the process executing portion API is commercialized, and the process executing unit 26 where the process contents of the work program are different is developed, a program developer may concentrate on a development of the work program by appropriating the commercialized process executing portion API. Therefore, a load of the program developer may be alleviated, and a period of time needed to develop the program may be shortened.

In FIG. 7, a process (hereinafter, simply referred to as process executing unit process) that is realized by the work program between the programs of the process executing unit 26 is called from the outside through the process executing portion API, and starts. In the idempotent call using the virtual idempotent function, since the possibility of the execution of the service of the same service ID being repetitively requested exists, first, in step 200, the service ID that is delivered as the argument at the time of calling is notified to the managing unit 24, and the process result (situation) when the execution of the service of the notified service ID is previously requested is inquired to the managing unit 24. Next, in step 202, based on the information notified form the managing unit 24, it is determined whether the process of when the execution of the service of the same service ID is previously requested is "being processed", and control is returned to the process executing portion API, when the execution of the service is "being processed".

Further, when the process of when the execution of the service of the same service ID is previously requested is not "being processed" (when the execution of the service of the service ID delivered as the argument is not requested in the past or the process of when the execution of the service of the same service ID is previously requested is completed), the procedure proceeds to step 204. Since the lower service 1 has idempotence, in step 204, regardless of the process situation of the lower service 1 (whether the lower service 1 is previously executed as the lower service corresponding to the service of the service ID delivered as the current argument or the process result of when the lower service 1 is previously executed as the lower service corresponding to the service of the service ID delivered as the current argument), the execution of the lower service 1 (lower service by the provider 46 in this case) is instructed to the service calling unit 32 corresponding to the lower service 1. Thereby, in the service calling unit 32 that corresponds to the lower service 1, the service calling unit process (to be described in detail below) is performed, and a service request is transmitted to the provider 46.

When the execution of the service of the service ID delivered as the current argument is not requested in the past, before instructing the service calling unit 32, the service ID that is delivered as the argument is notified to the service ID generating unit 30, generation of the service ID of the lower service 1 is requested, the service ID of the lower service 1 that is generated by the service ID generating unit 30 is associated with the service ID delivered as the argument through the managing unit 24, the association result is stored in the process situation table 38, and the service ID of the lower service 1 is notified to the service calling unit 32. When the execution of the service of the same service ID is requested in the past, before instructing the service calling unit 32, the service ID of the corresponding lower service 1 is extracted from the information notified from the managing unit 24, and the extracted service ID is notified to the service calling unit 32.

If the process result is notified from the service calling unit 32 corresponding to the lower service 1, in the next step 206, the process is divided according to the notified process result. That is, when the notified process result is "unknown" or "process non-completion", control is returned to the process executing portion API. In this case, the process of retrying or monitoring the retry count is performed by the process executing portion API. When the notified process result is a "work error", information indicating that the process result is the "work error" is notified to a call origin of the process executing unit 26 through the process executing portion API. In this case, a transmission of service requests that request to execute lower services 2 and 3 is skipped.

Meanwhile, when the notified process result is the "process completion", the process of the lower service 1 is normally completed, and thus, the procedure proceeds to step 210. Since the lower service 2 (here, lower service by the package wrapper 48) does not have idempotence, first, in step 210, the service ID that is delivered as the current argument is notified to the managing unit 24, and the process result (situation) of the service of the notified service ID is inquired to the managing unit 24. Next, in step 212, based on the information notified form the managing unit 24, the process result of when the lower service 2 is previously executed as the lower service corresponding to the service of the service ID delivered as the current argument is determined, and the process is divided according to the determined process result. In the previous steps 200 and 202, when it is determined that the execution of the service of the service ID delivered as the current argument is not requested in the past, the execution of step 210 may be skipped, and the process result in step 212 may be determined as "process non-completion".

When the process result determined in step 212 is "unknown" or "confirmation impossibility (for example, the confirmation of the process result of the lower service 2 is requested from the managing unit 24 to the result confirmation calling unit 36, however, a communication link with the package wrapper 48 is not fixed), control is returned to the process executing portion API. In this case, the process of retrying (of the process result confirmation) or monitoring the retry count is performed by the process executing portion API. When the determined process result is a "work error", information indicating that the process result is the "work error" is notified to a call origin of the process executing unit 26 through the process executing portion API. In this case, a transmission of the service request that requests to execute the lower service 3 is skipped. When the determined process result is a "process completion", a transmission of the service request that requests execute the lower service 2 is skipped, and the procedure proceeds to step 220.

Meanwhile, when the determined process result is the "process non-completion", the procedure proceeds to step 214. First, the service ID that is delivered as the argument is notified to the service ID generating unit 30 to request to generate the service ID of the lower service 2, the service ID of the lower service 2 that is generated by the service ID generating unit 30 is associated with the service ID delivered as the argument through the managing unit 24, the association result is stored in the process situation table 38, the service ID of the lower service 2 is notified to the service calling unit 32 corresponding to the lower service 2, and the execution of the lower service 2 is instructed. Thereby, in the service calling unit 32 that corresponds to the lower service 2, the service calling unit process (to be described in detail below) is performed, and a service request is transmitted to the package wrapper 48.

When the process result is notified from the service calling unit 32 corresponding to the lower service 2, in the next step 216, a process is divided according to the notified process result. That is, when the notified process result is "unknown" or "process non-completion", control is returned to the process executing portion API. In this case, the process of retrying or monitoring the retry count is performed by the process executing portion API. When the notified process result is a "work error", information indicating that the process result is the "work error" is notified to a call origin of the process executing unit 26 through the process executing portion API. In this case, a transmission of a service request that requests to execute the lower service 3 is skipped.

Meanwhile, when the notified process result is the "process completion", the process of the lower service 2 is also normally completed, and thus, the procedure proceeds to step 220. Since the lower service 3 has idempotence, in step 220, similar to the previous step 204, regardless of the process situation of the lower service 3, the execution of the lower service 3 (lower service by the MB wrapper 50 in this case) is instructed to the service calling unit 32 corresponding to the lower service 3. Thereby, in the service calling unit 32 that corresponds to the lower service 3, a service calling unit process (to be described in detail below) is performed, and a service request is transmitted to the MB wrapper 50.

When the execution of the service of the service ID that is delivered as the current argument is not requested in the past, before instructing the service calling unit 32, the service ID that is delivered as the argument is notified to the service ID generating unit 30, generation of the service ID of the lower service 3 is requested, the service ID of the lower service 3 that is generated by the service ID generating unit 30 is associated with the service ID delivered as the argument through the managing unit 24, the association result is stored in the process situation table 38, and the service ID of the lower service 3 is notified to the service calling unit 32. When the execution of the service of the same service ID is requested in the past, before instructing the service calling unit 32, the service ID of the corresponding lower service 3 is extracted from the information notified from the managing unit 24, and the extracted service ID is notified to the service calling unit 32.

If the process result is notified from the service calling unit 32 corresponding to the lower service 3, in the next step 222, the process is divided according to the notified process result. That is, when the notified process result is "unknown" or "process non-completion", control is returned to the process executing portion API. In this case, the process of retrying or monitoring the retry count is performed by the process executing portion API. When the notified process result is a "work error", information indicating that the process result is the "work error" is notified to a call origin of the process executing unit 26 through the process executing portion API. Meanwhile, when the notified process result is the "process completion", the process of the lower service 3 is also normally completed, and thus, information indicating that the process result is the "process completion" is notified to a call origin of the process executing unit 26 through the process executing portion API.

Figure 8:
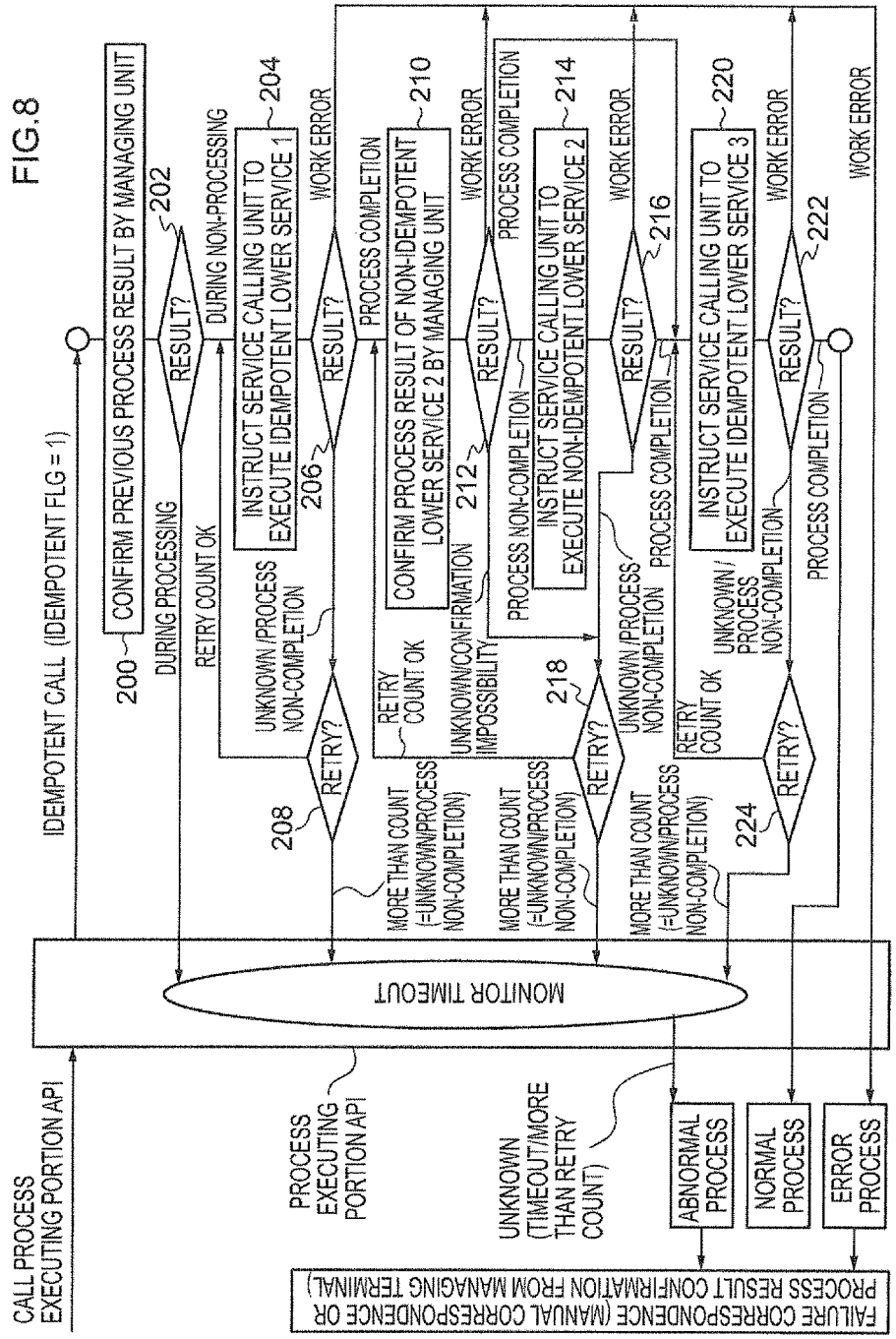
FIG. 8 is a flowchart illustrating an example (idempotent call, non-compensation, and internal retry) of a process executing unit process.

Next, only a portion of the process executing unit process illustrated in FIG. 8 that is different from the process executing unit process illustrated in FIG. 7 will be described. Similar to the process executing unit process illustrated in FIG. 7, the process executing unit process illustrated in FIG. 8 is performed under the condition where the execution of the service is requested with respect to the process executing unit 26 of the BPEL 44 by the idempotent call, and the compensating process is not executed by the process executing unit 26. The process executing unit process illustrated in FIG. 8 is different from the process executing unit process illustrated in FIG. 7 in that the retrying of the service request to the lower service processing unit and the monitoring of the retry count are performed by the work program, instead of the process executing portion API.

That is, in the process executing unit process illustrated in FIG. 8, in step 204, the execution of the lower service 1 is instructed to the service calling unit 32 corresponding to the lower service 1. In step 206, when the process result notified from the service calling unit 32 corresponding to the lower service 1 is "unknown" or "process non-completion", in step 208, it is determined whether the number of times of transmitting the service request to the provider 46 executing the lower service 1 reaches the predetermined value, thereby determining whether or not to retransmit (retry) the service request to the provider 46. When the number of times of transmitting the service request to the provider 46 is less than the predetermined value, the procedure is returned to step 204. The execution of the lower service 1 is instructed again to the service calling unit 32 corresponding to the lower service 1, thereby retransmitting the service request to the provider 46. When the number of times of transmitting the service request to the provider 46 reaches the predetermined value, information indicating that the process result is "unknown" or "process non-completion" is notified to a call origin of the process executing unit 26 through the process executing portion API. In this case, a transmission of service requests that request to execute the lower services 2 and 3 is skipped.

In the process executing unit process illustrated in FIG. 8, when the process result (situation) of the service is inquired to the managing unit 24 in step 210 and the process result of the lower service 2 determined in step 212 is "unknown" or "confirmation impossibility, and when the execution of the lower service 2 is instructed to the service calling unit 32 corresponding to the lower service 2 in step 214 and the process result notified from the service calling unit 32 corresponding to the lower service 2 in step 216 is "unknown" or "process non-completion", in step 218, it is determined whether the number of times of confirming the process result of the lower service 2 or the number of times of transmitting the service request to the package wrapper 48 reaches the predetermined value, thereby determining whether or not to execute the process again. Since lower service 2 does not have idempotence, the procedure is returned to step 210 when the number of times of confirming the process result of the lower service 2 or the number of times of transmitting the service request to the package wrapper 48 is less than the predetermined value, and the processes subsequent to the process result confirmation of the lower service 2 are executed again. When the number of times of confirming the process result of the lower service 2 or the number of times of transmitting the service request to the package wrapper 48 reaches the predetermined value, information indicating that the process result is "unknown" or "process non-completion" is notified to a call origin of the process executing unit 26 through the process executing portion API. In this case, a transmission of a service request that requests to execute the lower service 3 is skipped.

In the process executing unit process illustrated in FIG. 8, when the execution of the lower service 3 is instructed to the service calling unit 32 corresponding to the lower service 3 in step 220, and the process result notified from the service calling unit 32 corresponding to the lower service 3 is "unknown" or "process non-completion" in step 222, it is determined in step 224 whether the number of times of transmitting the service request to the MB wrapper 50 to execute the lower service 3 reaches the predetermined value, thereby determining whether or not to retransmit (retry) the service request to the MB wrapper 50. When the number of times of transmitting the service request to the MB wrapper 50 is less than the predetermined value, the procedure is returned to step 220, and the execution of the lower service 3 is instructed again to the service calling unit 32 corresponding to the lower service 3, thereby retransmitting the service request to the MB wrapper 50. When the number of times of transmitting the service request to the MB wrapper 50 reaches the predetermined value, information indicating that the process result is "unknown" or "process non-completion" is notified to a call origin of the process executing unit 26 through the process executing portion API.

Figure 9:
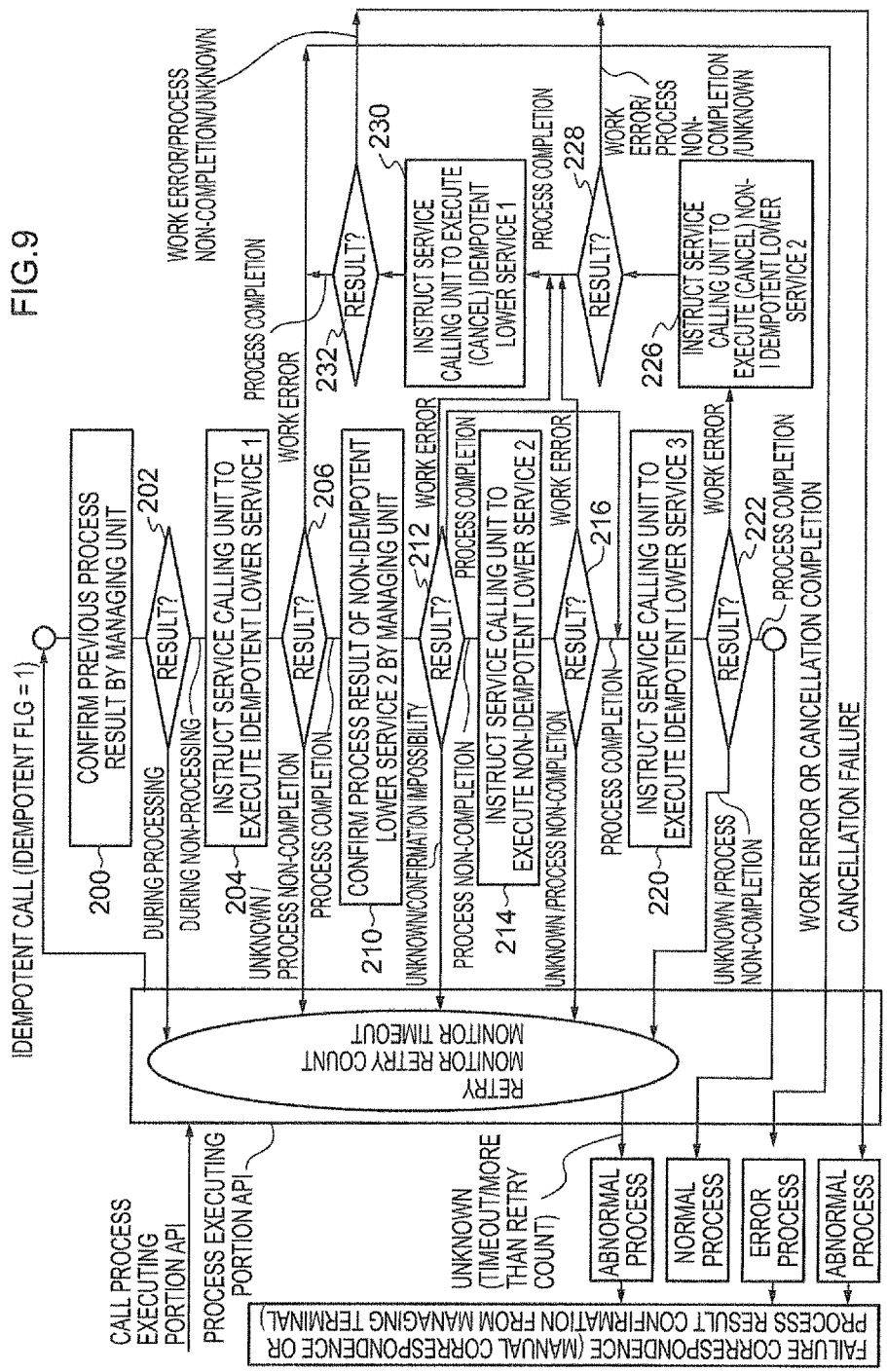
FIG. 9 is a flowchart illustrating an example (idempotent call and compensation) of a process executing unit process.

Next, only a portion of the process executing unit process illustrated in FIG. 9 that is different from the process executing unit process illustrated in FIG. 7 will be described. The process executing unit process illustrated in FIG. 9 is performed under the condition where the execution of the service is requested with respect to the process executing unit 26 of the BPEL 44 by the idempotent call, and the compensating process is executed by the process executing unit 26. The processes of monitoring timeout of a response from the lower service processing unit, and retrying the service request to the lower service processing unit and monitoring the retry count are performed by the process executing portion API, similar to the process executing unit process illustrated in FIG. 7.

In the process executing unit process illustrated in FIG. 9, when the process result (situation) of the service is inquired to the managing unit 24 in step 210 and the process result of the lower service 2 determined in step 212 is a "work error", and when the execution of the lower service 2 is instructed to the service calling unit 32 corresponding to the lower service 2 in step 214 and the process result notified from the service calling unit 32 corresponding to the lower service 2 is the "work error" in step 216, the procedure proceeds to step 230. In this case, among the lower services that correspond to the service of the service ID delivered as the current argument, the process result of the lower service 1 is the "process completion", and the process result of the lower service 2 is the "work error". In this state, since the process is not completed, contradiction is generated in data.

For this reason, in step 230, in order to take integrity of data, with respect to the service calling unit 32 corresponding to the lower service 1, the same service ID as that in the previous step 204 as the service ID of the lower service 1 is notified, and a transmission of a service request that requests to execute a process of canceling the process previously executed as the lower service 1 of the service ID is instructed. As a result, in the service calling unit 32 that corresponds to the lower service 1, a service calling unit process (to be described in detail below) is performed, and the service request is transmitted to the provider 46. In addition, if the process of canceling the previously executed process is performed by the provider 46 and data updated by the previously executed process exists, the data is recovered to the original data, and contradiction of the data is resolved (integrity of data is secured).

If the process result is notified from the service calling unit 32 corresponding to the lower service 1, in the next step 232, a process is divided according to the notified process result. That is, when the notified process result is "process completion", information indicating that the process result is the "work error" is notified to a call origin of the process executing unit 26 through the process executing portion API. Further, when the notified process result is the "work error", the "process non-completion", or "unknown", information indicating that the process result is a "cancellation failure" is notified to a call origin of the process executing unit 26 through the process executing portion API. In this case, a process where the contradiction of data is resolved and integrity is secured is performed by another process, such as a batch process.

Further, in the process executing unit process illustrated in FIG. 9, when the execution of the lower service 3 is instructed to the service calling unit 32 corresponding to the lower service 3 in step 220 and the process result notified from the service calling unit 32 corresponding to the lower service 3 is the "work error" in step 222, the procedure proceeds to step 226. In this case, among the lower services that correspond to the service of the service ID delivered as the current argument, the process results of the lower services 1 and 2 are the "process completion", and the process result of the lower service 3 is the "work error". In this state, since the process is not completed, contradiction is generated in data.

For this reason, in step 226, in order to take integrity of data, with respect to the service calling unit 32 corresponding to the lower service 2, the same service ID as that in the previous step 214 as the service ID of the lower service 2 is notified, and a transmission of a service request that requests to execute a process of canceling the process previously executed as the lower service 2 of the service ID is instructed. As a result, in the service calling unit 32 that corresponds to the lower service 2, a service calling unit process (to be described in detail below) is performed, and the service request is transmitted to the package wrapper 48. In addition, if the process of canceling the previously executed process is performed by the package wrapper 48 and data updated by the previously executed process exists, the data is recovered to the original data.

If the process result is notified from the service calling unit 32 corresponding to the lower service 2, in the next step 228, a process is divided according to the notified process result. That is, when the notified process result is the "work error", the "process non-completion", or "not clear", information indicating that the process result is a "cancellation failure" is notified to a call origin of the process executing unit 26 through the process executing portion API. In this case, a process where the contradiction of data is resolved and integrity is secured is performed by another process, such as a batch process. Further, when the notified process result is the "process completion", the procedure proceeds to step 230, the above-described process is executed in step 230, and the service request that requests to execute the process of canceling the previously executed process is transmitted to the provider 46. If the process of canceling the previously executed process is also executed in the provider 46 and data updated by the previously executed process exists, the data is recovered to the original data and the contradiction of the data is resolved (integrity of the data is secured).

Figure 10:
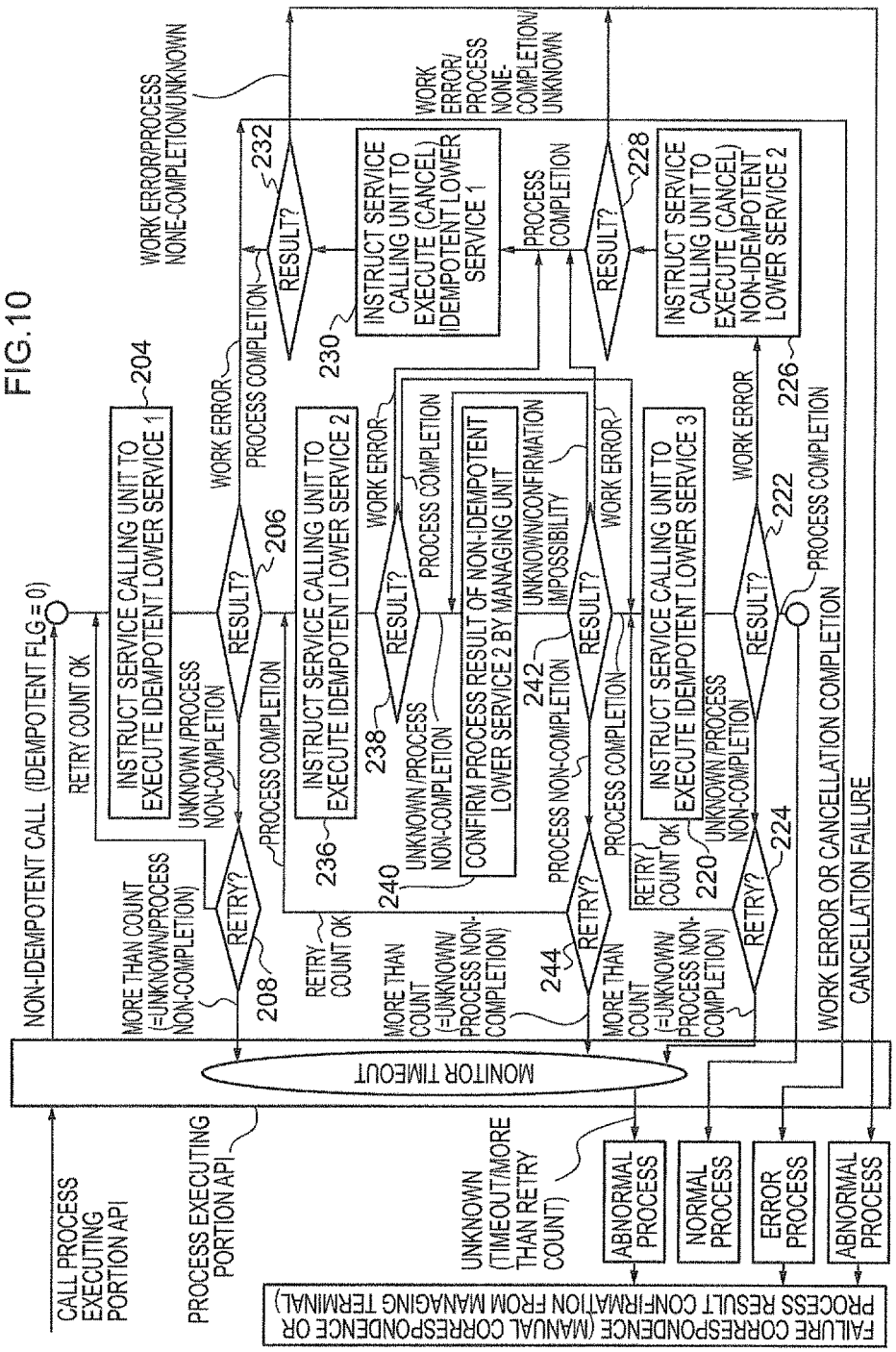
FIG. 10 is a flowchart illustrating an example (non-idempotent call, compensation, and internal retry) of a process executing unit process.
Figure 11:
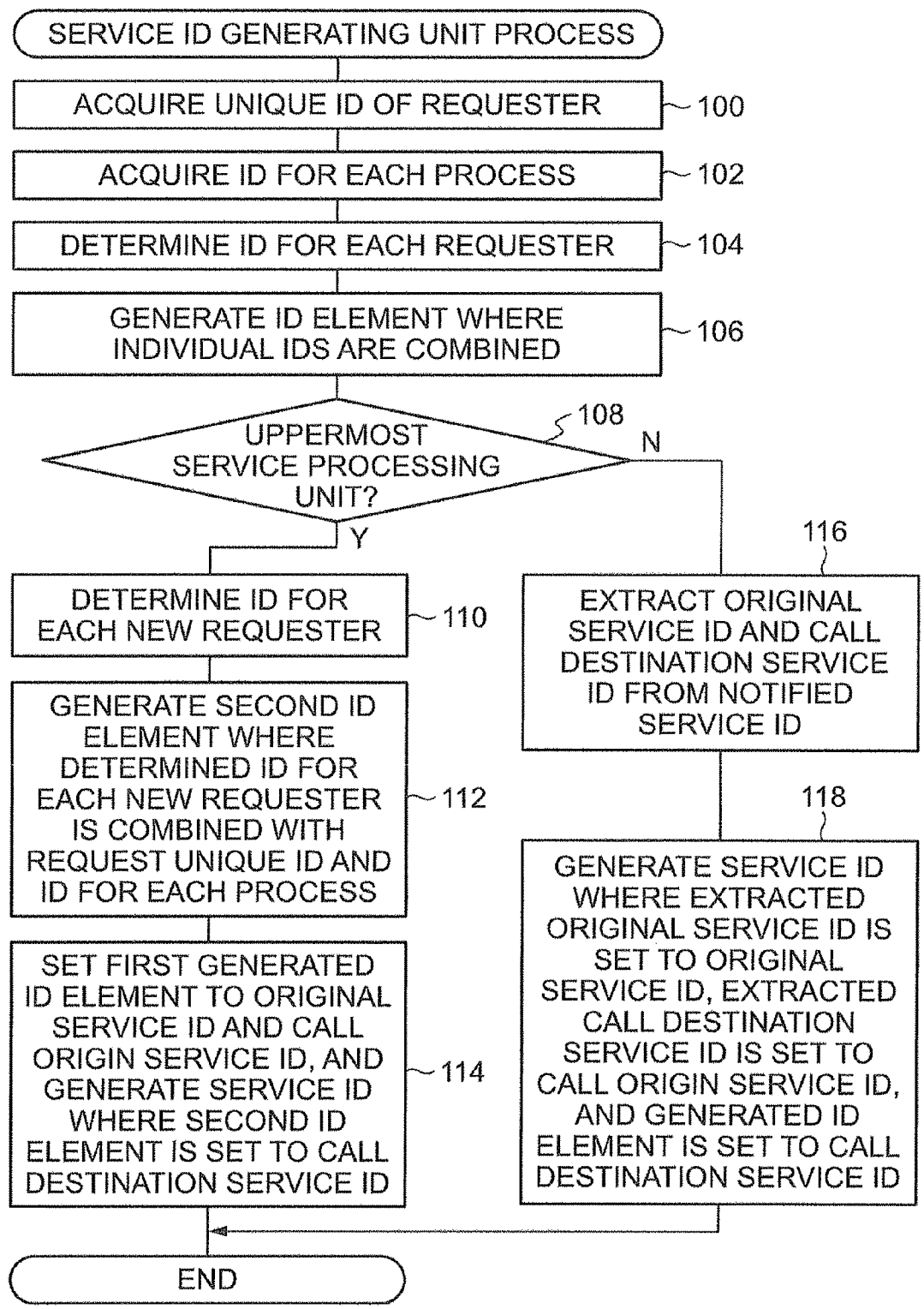
FIG. 11 is a flowchart illustrating a service ID generating unit process.
Figure 12:
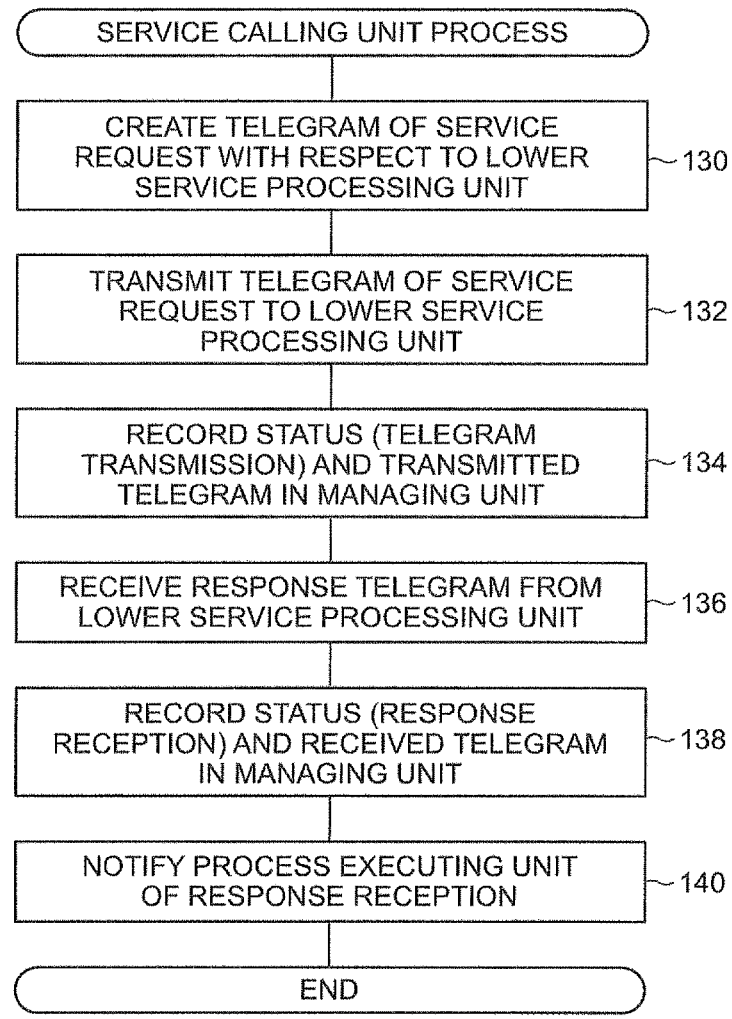
FIG. 12 is a flowchart illustrating a service calling unit process.
Figure 13:
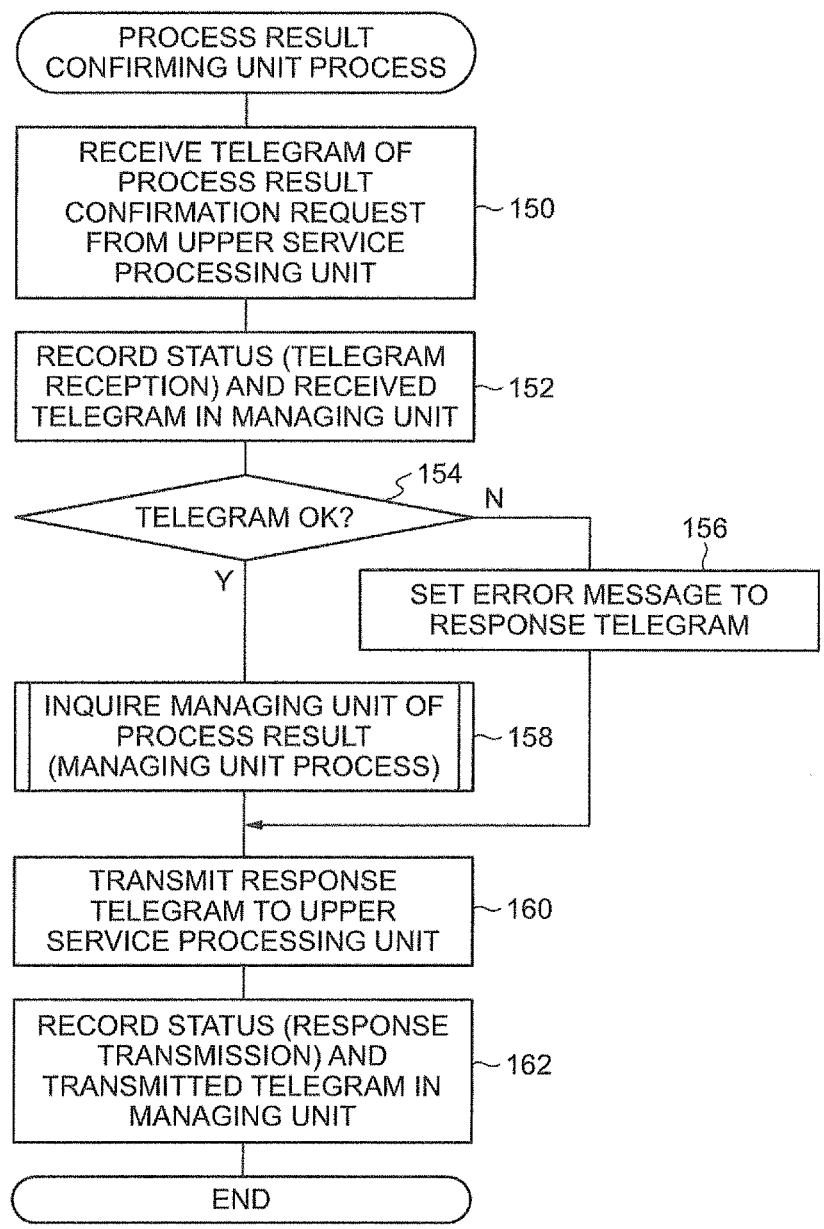
FIG. 13 is a flowchart illustrating a process result confirming unit process.
Figure 14:
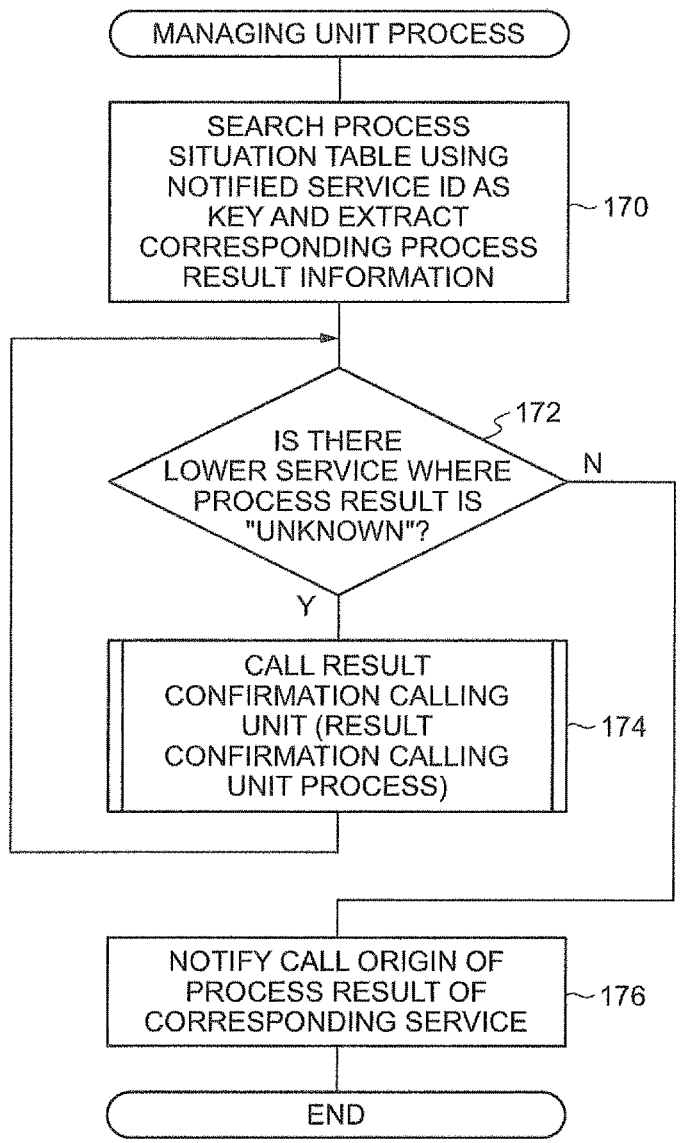
FIG. 14 is a flowchart illustrating a managing unit process.
Figure 15:
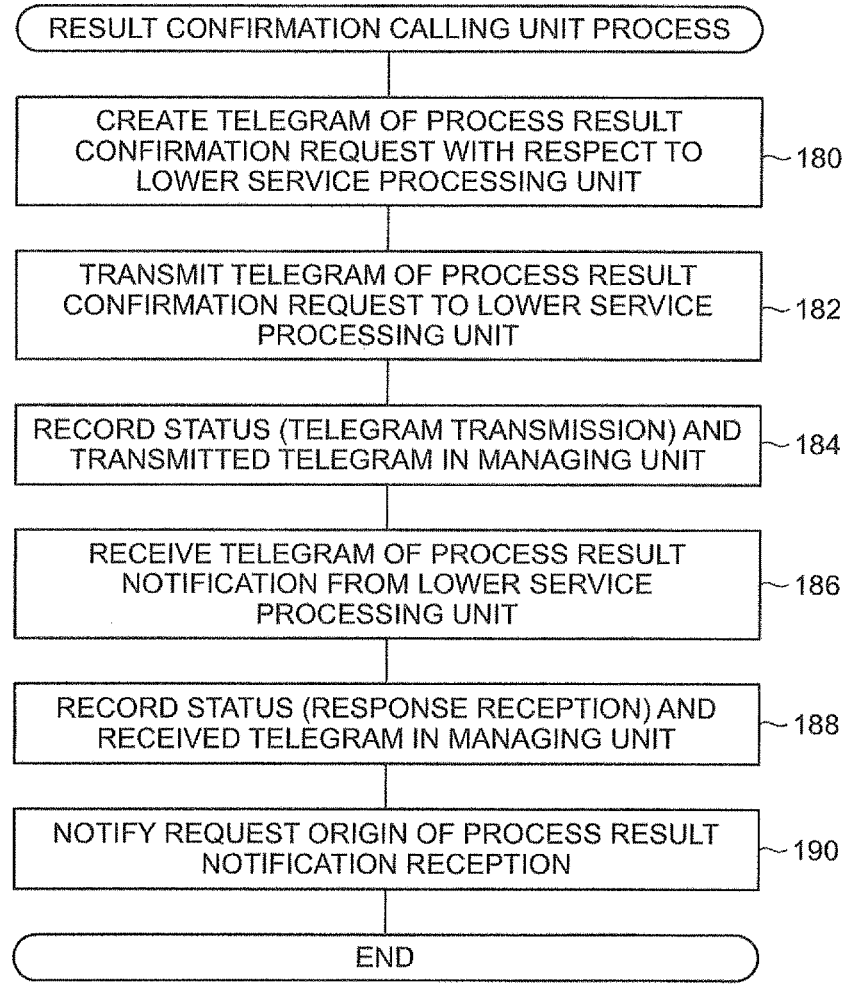
FIG. 15 is a flowchart illustrating a result confirmation calling unit process.

Next, only a portion of the process executing unit process illustrated in FIG. 10 that is different from the process executing unit processes illustrated in FIGS. 7 to 9 will be described. The process executing unit process illustrated in FIG. 10 is performed under the condition where the execution of the service is requested with respect to the process executing unit 26 of the BPEL 44 by the non-idempotent call, and the compensating process is executed by the process executing unit 26. Similar to the process executing unit process illustrated in FIG. 7, in the process executing unit process illustrated in FIG. 10, processes of retrying the service request to the lower service processing unit and monitoring the retry count are performed by the work program, and a process of monitoring timeout is performed by the process executing portion API.

In the non-idempotent call that does not use a virtual idempotent function, since the execution of the service of the same service ID is not requested plural times, steps 200 and 202 are omitted in the process executing unit process illustrated in FIG. 10. First, in step 204, the execution of the lower service 1 is instructed to the service calling unit 32 corresponding to the lower service 1. Next, in step 206, when the process result notified from the service calling unit 32 corresponding to the lower service 1 is "unknown' or "process non-completion", similar to the process executing unit process illustrated in FIG. 8, it is determined in step 208 whether or not to retransmit (retry) the service request to the provider 46. When the number of times of transmitting the service request to the provider 46 is less than the predetermined value, the procedure is returned to step 204, and the execution of the lower service 1 is instructed again to the service calling unit 32 corresponding to the lower service 1, thereby retransmitting the service request to the provider 46. When the number of times of transmitting the service request to the provider 46 reaches the predetermined value, information indicating that the process result is "unknown" or the "process non-completion" is notified to a call origin of the process executing unit 26 through the process executing portion API. In this case, a transmission of service requests that request to execute lower services 2 and 3 is skipped.

In the process executing unit process illustrated in FIG. 10, when the process result notified from the service calling unit 32 corresponding to the lower service 1 is "process completion" in step 206, in the next step 236, the execution of the lower service 2 is instructed to the service calling unit 32 corresponding to the lower service 2. When the process result is notified from the service calling unit 32 corresponding to the lower service 2, the procedure proceeds to step 238, and a process is divided according to the process result of the notified lower service 2. That is, when the notified process result is the "work error", the procedure proceeds to step 230. Similar to the process executing unit process illustrated in FIG. 9, the process of canceling the previously executed process is performed by the provider 46 according to the request to execute the lower service 1. When the notified process result is "process completion", the procedure proceeds to step 220.

Meanwhile, when the notified process result is "unknown" or "process non-completion", in consideration of the fact that the lower service 2 does not have idempotence and the process executing unit process illustrated in FIG. 10 is called by a non-idempotent call, the process result of the lower service 2 is inquired to the managing unit 24 in step 240, the process result of the lower service 2 is determined in step 242, and a process is divided according to the determined process result. When the process result of the lower service 2 is switched into the "work error" through the processes of steps 240 and 242, the procedure proceeds to step 230. When the process result of the lower service 2 is switched into the "process completion" through the processes of steps 240 and 242, the procedure proceeds to step 220. When the process result of the lower service 2 is "unknown", it is difficult to determine handling. However, as the reconfirmation result of the process result, when the process result is switched to the "work error" or the "process completion", it becomes easy to determine handling. When the process result of the lower service 2 determined in step 242 is "not clear" or "confirmation impossibility", the procedure is returned to step 240, and the processes of steps 240 and 242 are executed again.

Meanwhile, when the process result of the lower service 2 determined in step 242 is the "process non-completion", the procedure proceeds to step 244, and it is determined whether or not to retransmit (retry) the service request to the package wrapper 48. When the number of times of transmitting the service request to the package wrapper 48 is less than the predetermined value, the procedure is returned to step 236, and the execution of the lower service 2 is instructed again to the service calling unit 32 corresponding to the lower service 2, thereby retransmitting the service request to the package wrapper 48. When the number of times of transmitting the service request to the package wrapper 48 reaches the predetermined value, information indicating that the process result is "not clear" or the "process non-completion" is notified to a call origin of the process executing unit 26 through the process executing portion API. In this case, a transmission of a service request that requests to execute the lower service 3 is skipped.

In step 220, the execution of the lower service 3 is instructed to the service calling unit 32 corresponding to the lower service 3. Next, in step 222, when the process result notified from the service calling unit 32 corresponding to the lower service 3 is "not clear" or "process non-completion", similar to the process executing unit process illustrated in FIG. 8, it is determined in step 224 whether or not to retransmit (retry) the service request to the MP wrapper 50. When the number of times of transmitting the service request to the MB wrapper 50 is less than the predetermined value, the procedure is returned to step 220, and the execution of the lower service 3 is instructed again to the service calling unit 32 corresponding to the lower service 3, thereby retransmitting the service request to the MB wrapper 50. When the number of times of transmitting the service request to the MB wrapper 50 reaches the predetermined value, information indicating that the process result is "unknown" or the "process non-completion" is notified to a call origin of the process executing unit 26 through the process executing portion API.

In the process executing unit process illustrated in FIG. 10, when the process result notified from the service calling unit 32 corresponding to the lower service 3 is the "work error" in step 222, the procedure proceeds to step 226. Similar to the process executing unit process illustrated in FIG. 9, the process of canceling the previously process executed by the package wrapper 48 is performed by the package wrapper 48 according to the request to execute the lower service 2, and the process of canceling the previously process executed by the provider 46 is performed by the provider 46 according to the request to execute the lower service 1. Further, when the notified process result is "process completion", information indicating that the process result is the "process completion" is notified to a call origin of the process executing unit 26 through the process executing portion API.

In FIGS. 7 to 10, the process executing unit process of when the own service corresponding to the execution requested service does not exist is illustrated. However, when the own service corresponding to the execution requested service exists, the process of the corresponding own service is executed by the process executing unit 26, the process result is associated with the service ID delivered as the argument, and the association result is stored in the process situation table 38.

In the service processing unit of which lower service processing unit exists, the service ID generating unit 30 is provided. The service ID generating unit 30 executes the service ID generating unit process illustrated in FIG. 11, whenever generation of the service ID is requested from the process executing unit 26.

During the service ID generating unit process, first, in step 100, a unique ID in the service processing unit (own service processing unit) including the own unit (service ID generating unit 30) is acquired as a request unique ID. As the unique ID in the own service processing unit, for example, a network ID of the service processing server 12 where the own service processing unit is operated may be applied. In step 102, an ID that is allocated to a process executing the service processing program for realizing the own service processing unit is acquired as an ID for each process. In step 104, a different ID is determined as an ID for each request, whenever a service ID is generated. As the ID for each request, for example, a simple sequence number or time at the time of determining an ID may be applied. In step 106, as ID elements where the individual IDs are combined, ID elements where a request unique ID, an ID for each process, and an ID for each request are arranged in series are generated as an example illustrated in FIG. 16A.

Figure 16A:
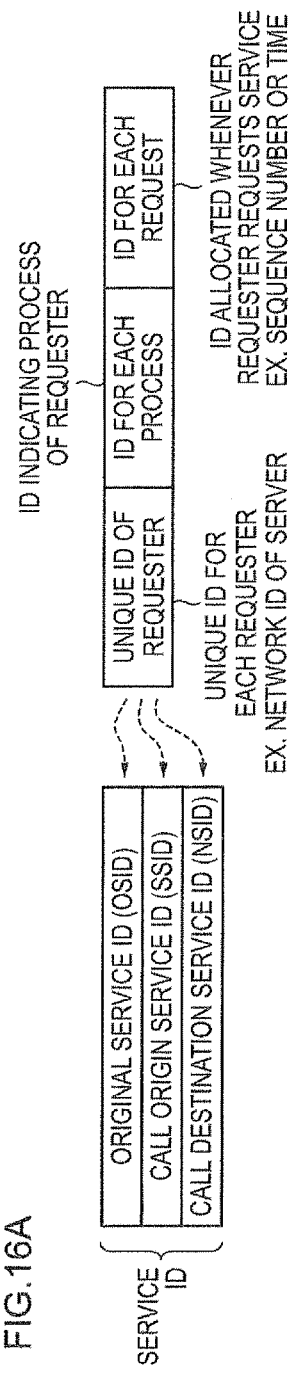
FIGS. 16A and 16B are conceptual diagrams illustrating an example of a system and transition of a service ID.

Next, in step 108, it is determined whether the own service processing unit is the uppermost service processing unit of which upper service processing unit does not exist. When the determination is affirmative, the procedure proceeds to step 110, and a new ID for each request (ID different from the ID for each request determined in the previous step 214) is determined. Next, in step 112, the new ID for each request determined in step 110 is combined with the request unique ID acquired in the previous step 100 and the ID for each process acquired in the previous step 102, thereby generating a new ID element (second ID element). As illustrated in FIG. 16A, the service ID according to this exemplary embodiment includes an original service ID (OSID), a call origin service ID (SSID), and a call destination service ID (NSID). Next, in step 114, the ID element generated in the previous step 106 is set to each of the original service ID and the call origin service ID, a service ID where the second ID element generated in step 112 is set to the call destination service ID is generated, and (refer to a service processing unit A illustrated in FIG. 16B), the generated service ID is notified to the process executing unit 26, and the process is completed.

The service ID that is generated by the service ID generating unit 30 provided in the uppermost service processing unit is not limited to differentiating the ID element set to the original service ID and the call origin service ID and the ID element set to the call destination service ID, and a service ID where the same ID element is set to the original service ID, the call origin service ID, and the call destination service ID may be generated.

Meanwhile, when there is an upper service processing unit of the own service processing unit and the own service processing unit is not the uppermost service processing unit, the determination of step 108 becomes negative and the procedure proceeds to step 116. When the own service processing unit is not the uppermost service processing unit, the service ID that is added to the service request that the own service processing units has received from the upper service processing unit is notified from the process executing unit 26. In step 116, the ID element set as the original service ID and the ID element set as the call destination service ID are extracted from the service ID notified from the process executing unit 26. In step 118, the ID element that is set as the original service ID in the notified service ID is set to the original service ID, the ID element set as the call destination service ID in the notified service ID is set to the call origin service ID, the service ID where the ID element generated in the previous step 216 is set to the call destination service ID is generated (refer to the service processing units B to D illustrated in FIG. 16B), the generated service ID is notified to the process executing unit 26, and the process is completed.

In the service processing system 10 according to this exemplary embodiment, the service ID generating unit 30 is provided in each service processing unit of which lower service processing unit exists, and a service ID is generated in each service ID generating unit 30. As described above, since the ID element includes a unique ID of a requester, in the ID element that is generated in the service ID generating unit 30 of each service processing unit, uniqueness with at least each service processing unit as a unit is secured. Further, since an ID for each process is included in the ID element, in the ID element that is generated in the service ID generating unit 30 of each service processing unit, uniqueness in each service processing unit is also secured. Accordingly, in the ID element that is generated in the service ID generating unit 30 of each service processing unit, uniqueness in the service processing system 10 is secured (non-overlapping of the ID element and another ID element is ensured). As a result, a numbering process accompanied with exclusive control does not need to be performed to generate an ID element (service ID) where uniqueness is secured, and performance of the service processing system 10 may be prevented from being greatly lowered due to the numbering process accompanied with exclusive control.

Since the ID element also includes a process ID, even when plural processes that function as the same service processing unit exist in the single service processing server 12, the service processing unit that processes the corresponding service request among the plural service processing units may be determined by referring to the process ID among the service IDs added to the service request.

Figure 16B:
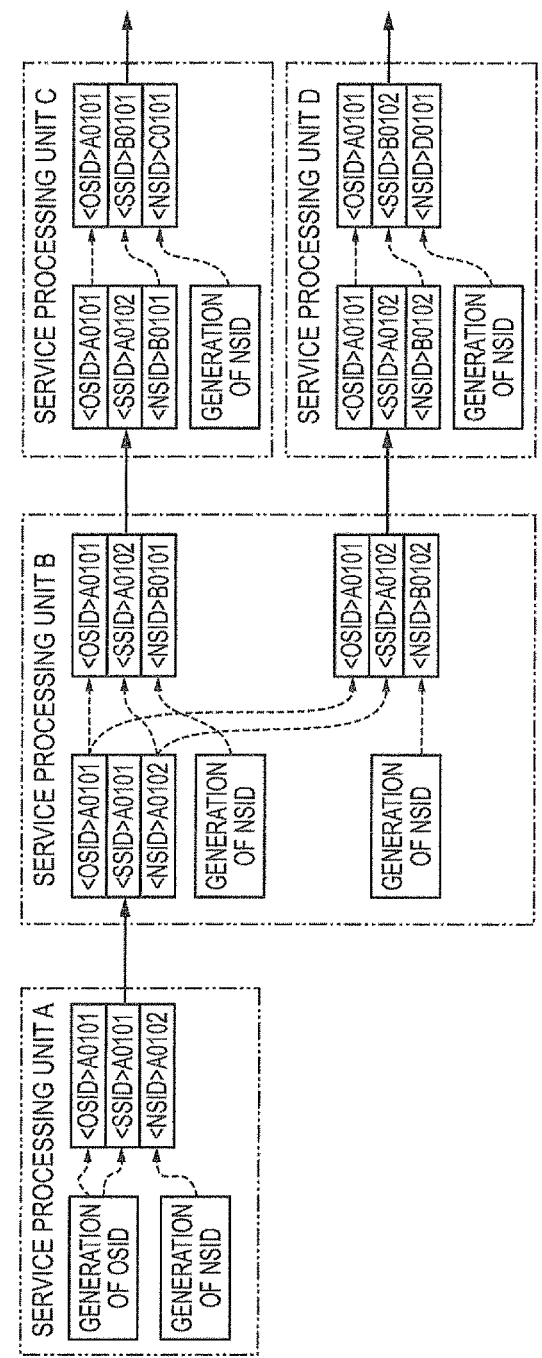

By performing the service ID generating unit process, the service ID that is transmitted from the uppermost service processing unit to the lower service processing unit is transited as illustrated in FIG. 16B, and the original service ID is constant. In a call origin service ID among service IDs that are output (added to a service request) from a certain service processing unit whose upper service processing unit exists, the same ID element as a call destination service ID in the service ID received from the upper service processing unit is set. In a call origin service ID among the service IDs that are output from the certain service processing unit, an ID element to identify the certain service processing unit is set. As a result, even when a failure is generated in the service processing system 10 and a non-processed service request still remains in a specific service processing unit, the service processing unit that has transmitted the remaining service request may be identified from the ID element set as the call origin service ID in the service ID added to the remaining service request. This identifying process is repeated while the corresponding service ID (call origin service ID is the same service ID as the call destination service ID) is searched, and a process history of the remaining non-processed service request may be grasped.

The service ID includes the call origin service ID and the call destination service ID. In this case, for example, as illustrated in FIG. 17, after the service request is transmitted from the service processing unit A through the service processing units B and C to the service processing units D and E, when a failure is generated in the service processing units B and C and information recorded in the service processing units B and C is lost, if a service ID including only a call origin service ID and a call destination service ID is recorded in the service processing units D and E, the same service request may not be searched based on the ID element set to the call origin ID and the call destination ID of the service ID. Meanwhile, the original service ID is added to the service ID and the original ID is referred to even when a failure is generated, and information where the original service ID is associated with the same service ID may be assumed as information corresponding to the same service request. For example, by a batch process, information corresponding to the same service request may be searched and extracted using the original service ID as a key, and contradiction of data may be resolved and integrity may be taken.

In the service processing unit whose lower service processing unit exists, the service calling unit 32 is provided as many as the lower service processing unit. The service calling unit 32 executes the service calling unit process illustrated in FIG. 12, whenever a service ID of a lower service is notified from the process executing unit 26 and an execution of the lower service is requested. During the service calling unit process, first, in step 130, a telegram of a service request that requests the lower service processing unit to execute the lower service is created. A service ID of the lower service that is notified from the process executing unit 26 is added to the telegram. Next, in step 132, the telegram of the service request created in step 130 is transmitted to the corresponding lower service processing unit. In step 134, status information indicating that the telegram of the service request is transmitted to the corresponding lower service processing unit and the transmitted telegram are stored in the process situation table 38 of the managing unit 24.

If a response telegram is transmitted from the corresponding lower service processing unit with respect to the telegram of the service request transmitted in step 132, in the next step 136, the response telegram that is transmitted from the lower service processing unit is received. In step 138, status information indicating that the response telegram with respect to the service request is received from the lower service processing unit and the received response telegram are stored in the process situation table 38 of the managing unit 24. The received response telegram includes information indicating a process result of the lower service and a service ID of the lower service. By this process, the information is also stored in the process situation table 38. In step 140, the information indicating that the response telegram with respect to the service request is received from the lower service processing unit, and the service ID of the lower service set to the received response telegram and the process result of the lower service are notified to the process executing unit 26, and the service calling unit process is completed.

In the service processing unit of which upper service processing unit exists, the process result confirming unit 34 is provided. The process result confirming unit 34 executes the process result confirming unit process illustrated in FIG. 13, when the telegram of the process result confirmation request is received from the upper service processing unit. During the process result confirming unit process, first, in step 150, the telegram of the process result confirmation request is received from the upper service processing unit. Next, in step 152, status information indicating that the telegram of the process result confirmation request is received from the upper service processing unit and the received telegram are stored in the process situation table 38 of the managing unit 24. Next, in step 154, contents of the received telegram are checked to determine whether the contents of the received telegram are appropriate or not. When the determination is negative, the procedure proceeds to step 156. An error message is set to the response telegram to be transmitted to the upper service processing unit, and the procedure proceeds to step 160.

Meanwhile, when the contents of the received telegram are appropriate, the determination of step 154 becomes affirmative, and the procedure proceeds to step 158. A service ID of a service of a process result confirmation object that is added to the received telegram of the process result confirmation request is extracted, the extracted service ID is notified to the managing unit 24, and a process result of the corresponding service is inquired to the managing unit 24. As a result, in the managing unit 24, the managing unit process (to be described in detail below) is performed. If the managing unit process by the managing unit 24 is completed and the inquired process result is notified, after the notified process result is set to the response telegram to be transmitted to the upper service processing unit, the procedure proceeds to step 160. In step 160, the response telegram that is generated in step 156 or 158 is transmitted to the upper service processing unit. In step 162, status information indicating that the response telegram is transmitted to the upper service processing unit and the transmitted response telegram are stored in the process situation table 38 of the managing unit 24, and the process result confirming unit process is completed.

In the managing unit 24, the service ID is notified from the process result confirming unit 34 or the process executing unit 26. The managing unit 24 executes the managing unit process illustrated in FIG. 14, whenever a process result of a service of the notified service ID is inquired.

During the managing unit process, first, in step 170, the process situation table 38 is searched using the service ID notified from the process result confirming unit 34 or the process executing unit 26 as a key, and process result information (information indicating a process result of a corresponding own service or lower service) that is associated with the notified service ID and registered in the process situation table 38 is extracted. Next, in step 172, while referring to the extracted process result information, it is determined whether a lower service having a process result of "unknown" exists in the service corresponding to the notified service ID. When there is no lower service that corresponds to a service of a process result confirmation object (service of the notified service ID) or when the corresponding lower service exists but a process result of the lower service is "process completion", the determination becomes negative, and the procedure proceeds to step 176. The process result that is indicated by the process result information extracted in step 170 is inquired and notified to the original process resulting confirming unit 34 or process executing unit 26, and the process is completed. When the notified service ID is not registered in the process situation table 38, information indicating non-registration is inquired and notified to the original unit.

When there is a lower service that corresponds to the service of the process result confirmation object and a process result of the lower service is "unknown", the determination of step 172 becomes affirmative, and the procedure proceeds to step 174. A service ID of the lower service that has a process result of "unknown" is notified to the result confirmation calling unit 36 corresponding to the lower service that has a process result of "unknown", and thereby requesting to confirm the process result of the corresponding lower service. As a result, in the result confirmation calling unit 36, a result confirmation calling unit process (to be described in detail below) is performed. If the result confirmation calling unit process in the result confirmation calling unit 36 is completed and the process result of the lower service confirmed by the result confirmation calling unit 36 is notified, the procedure is returned to step 172. Thereby, when plural lower services having a process result of "unknown" exist in a service corresponding to the service of the process result confirmation object, the process of step 174 is repeated, and the process results of all the lower services are confirmed by the corresponding result confirmation calling unit 36. If the determination of step 172 becomes negative, the procedure proceeds to step 176. The process result of the service of the process result confirmation object including the process result of the lower service notified from the result confirmation calling unit 36 is inquired and notified to the original process result confirming unit 34 or process executing unit 26, and the process is completed.

In the service processing unit of which lower service processing unit exists, the result confirmation calling unit 36 is provided as many as the lower service processing unit. The result confirmation calling unit 36 executes the result confirmation calling unit process illustrated in FIG. 15, whenever the service ID of the lower service is notified from the managing unit 24 and a confirmation of the process result of the lower service is requested. During the result confirmation calling unit process, first, in step 180, a telegram of a process result confirmation request that requests the lower service processing unit to notify the process result of the lower service is created. A service ID of the lower service that is notified from the managing unit 24 is added to the telegram. Next, in step 182, the telegram of the process result confirmation request created in step 180 is transmitted to the corresponding lower service processing unit. In step 184, status information indicating that the telegram of the process result confirmation request is transmitted to the corresponding lower service processing unit and the transmitted telegram are stored in the process situation table 38 of the managing unit 24.

If a response telegram is transmitted from the corresponding lower service processing unit with respect to the telegram of the process result confirmation request transmitted in step 182, in the next step 186, the response telegram that is transmitted from the lower service processing unit is received. In step 188, status information indicating that the response telegram with respect to the process result confirmation request is received from the lower service processing unit and the received response telegram are stored in the process situation table 38 of the managing unit 24. The received response telegram includes information indicating a process result of the lower service and a service ID of the lower service. By this process, the information is also stored in the process situation table 38. In step 190, the information indicating that the response telegram with respect to the process result confirmation request is received from the lower service processing unit, and the service ID of the lower service set to the received response telegram and the process result of the lower service are notified to the managing unit 24, and the process result confirmation calling unit process is completed.

In the above description, the functions of the service processing unit are divided for each functional block, for the convenience of explanation. However, a service processing program that causes each service processing server 12 to function as the service processing unit may be divided or integrated for each functional block.

Since each service processing unit is constructed based on the reference model, the process in each service processing unit almost becomes a standardized process, and programs for realizing the service receiving unit 28, the service ID generating unit 30, the service calling unit 32, the process result confirming unit 34, and the result confirmation calling unit 36 among the programs for realizing the service processing unit and the process executing portion API among the programs for realizing the process executing unit 26 may be commercialized. As a result, a program developer may develop a service processing program by appropriating the commercialized programs and concentrate on a development of a program (for example, work program of the process executing unit 26) for realizing a unique process different for each service processing unit. Therefore, a load of the program developer may be greatly alleviated, and a period of time needed to develop the program may be greatly reduced.

Among the individual service processing units in the service processing system 10, in the BPEL 44, since a service processing program is operated on the platform of the BPEL, a program of the process executing unit 26 for realizing the virtual idempotent function may be easily developed using the function provided by the BPEL. That is, the platform of the BPEL provides the following functions. The platform generates a process (also called an instance) to execute a called program, whenever a certain program is called, sets an argument at the time of calling to a predetermined area (called business objects (BO)) corresponding to the generated process among storage areas of a storage component of a memory 12B, sets status information indicating a process progress situation in the generated process, and appropriately updates the status information according to the variation in the process progress state in the corresponding process.

Figure 18:
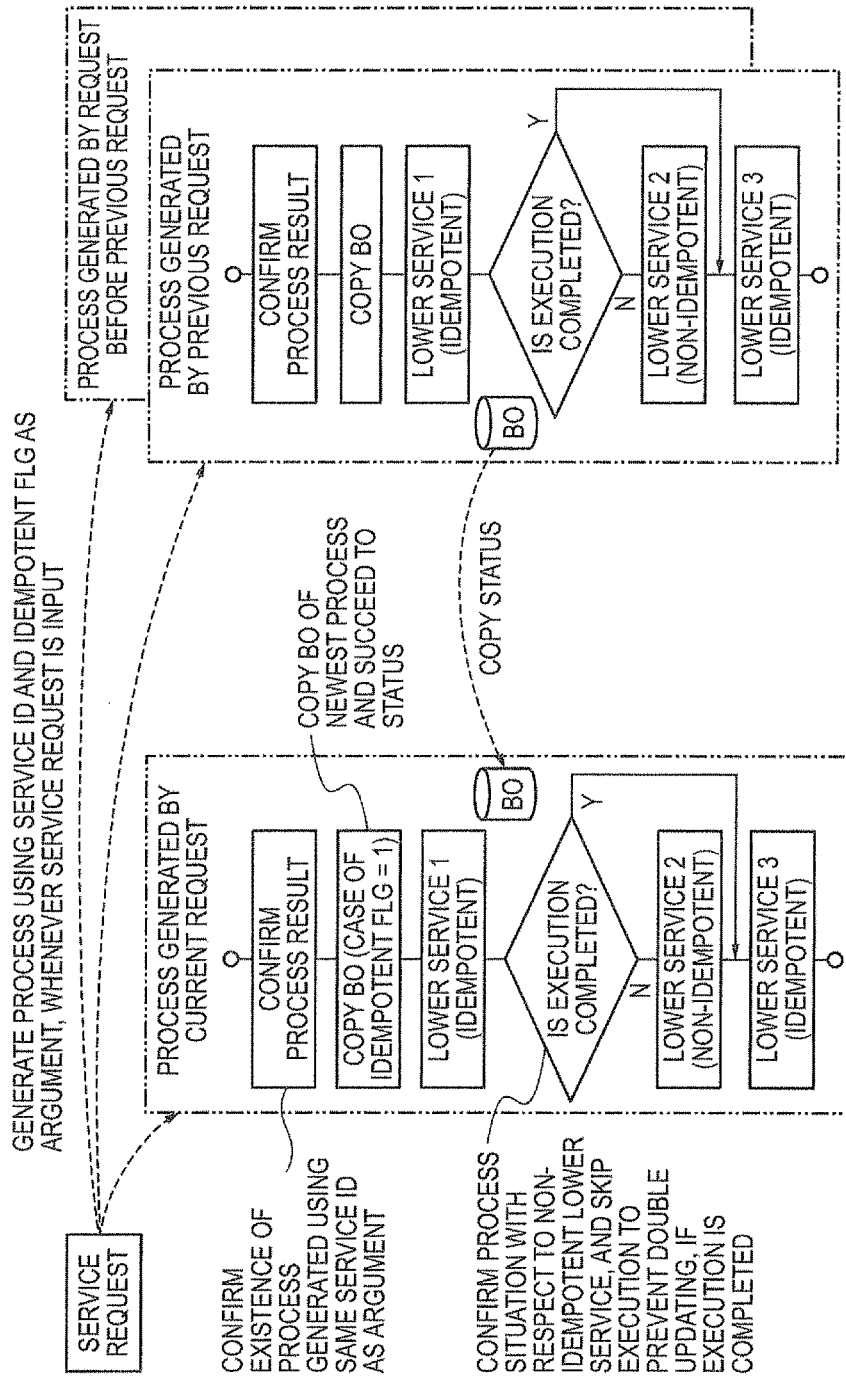
FIG. 18 is a diagram illustrating realizing of a virtual idempotent function in a BPEL.

As illustrated in FIG. 18, by using the above functions, if a program (may include a program functioning as the service receiving unit 28 or a program functioning as the service calling unit 32) functioning as at least the process executing unit 26 among the programs of the service processing unit is called using a service ID and an idempotent flag as an argument and starts, it is confirmed whether there is other process that is generated using the same service ID as the own process as an argument (refer to "process result confirmation" of FIG. 18). In this way, if the program is configured, whether a transmission of a service request corresponding to the current call is a retransmission of the service request received in the past may be simply confirmed. Further, the program is configured to copy status information from a BO of other process (corresponds to the newest (finally generated) other process, when other processes exist), when there is other process that is generated using the same service ID as the own process as an argument (refer to "BO copy" of FIG. 18). The program may cause the service request corresponding to the current call to succeed to the process status of the previously received service request and cause the process to start from the previous process by a simple process. The program is configured to confirm a process result of a non-idempotent lower service corresponding to an execution required service, when the non-idempotent lower service exists, and skip the execution request of the lower service when the process result is "process completion" (refer to "process completion?" of FIG. 18), and the virtual idempotent function may be realized by a simple process. As such, a development load of the service processing program can further alleviated by using a feature of the platform of the BPEL.

In the service processing system 10 according to this exemplary embodiment, when the individual service processing unit receives a service request or a process result confirmation request, the individual service processing unit executes the process according to the process sequence illustrated in FIG. 3 or FIG. 4, and the service request or the process result confirmation request that is transmitted by the uppermost-service processing unit is concatenated over the service processing units of the plural stages. Hereinafter, a process sequence of the service processing system 10 of when the service request or the process result confirmation request is transmitted from the uppermost service processing unit will be described. In the description below, it is assumed that an object service is a service that needs an execution of a lower service by each of the provider 46, the package wrapper 48, and the MB wrapper 50.

Figure 19:
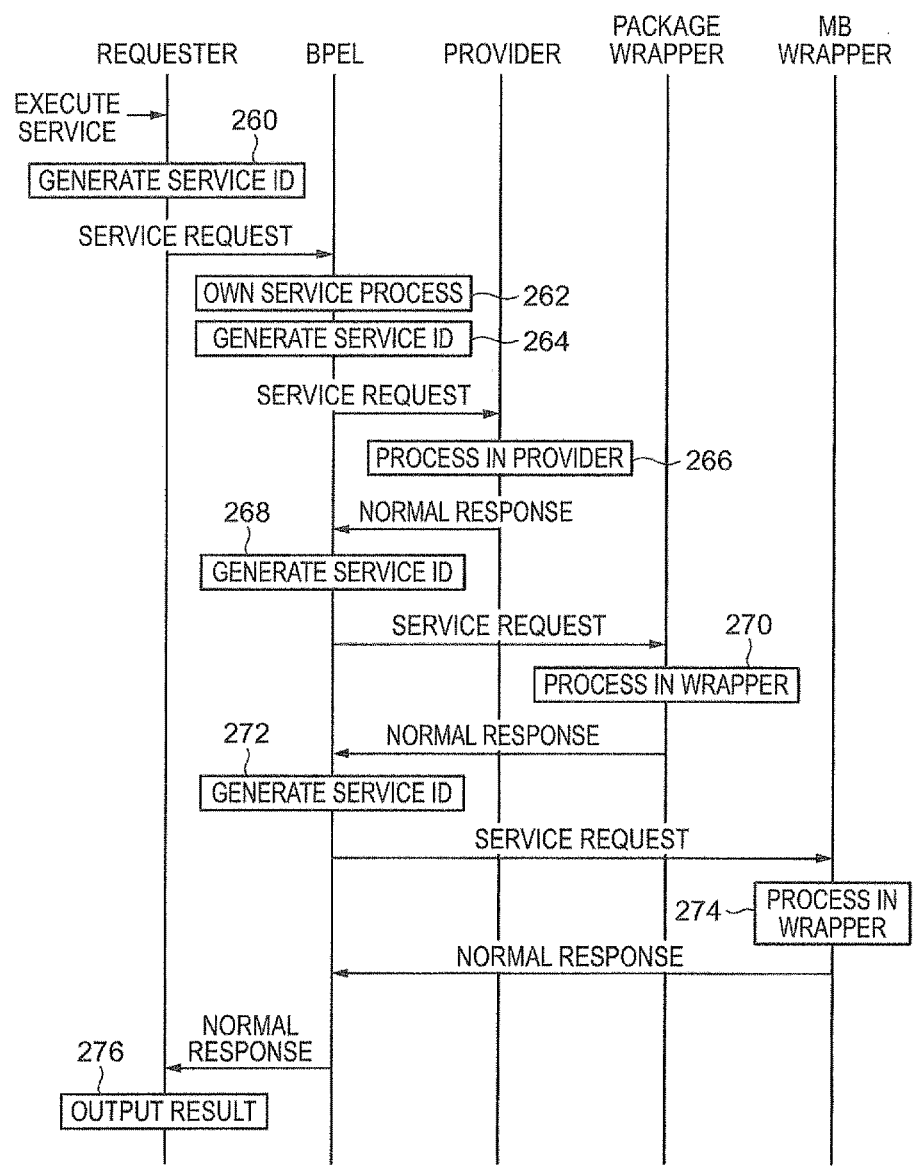
FIG. 19 is a sequence diagram illustrating an example of a sequence of a service processing system of when an execution of a service is instructed.

An example of a sequence of when an execution of a service is instructed to the uppermost service processing unit (requester 42) is illustrated in FIG. 19. In the sequence, if the execution of the service is instructed to the requester 42, a service ID (service ID transmitted to the BPEL 44) of a lower service is generated by a service ID generating unit 30 of the requester 42 (refer to step 260 of FIG. 19), and a service request is transmitted to the BPEL 44 by a service calling unit 32 of the requester 42.

When there is an own service that corresponds to the execution requested service, the process executing unit 26 of the BPEL 44 that has received the service request executes a process of the own service (refer to step 262 of FIG. 19), generates a service ID (service ID transmitted to the provider 46) of the lower service 1 by the service ID generating unit 30 (refer to step 264 of FIG. 19), calls the service calling unit 32 corresponding to the provider 46, and transmits the service request to the provider 46 by the service calling unit 32 corresponding to the provider 46. In the provider 46 that has received the service request, a process of the requested lower service 1 is executed by the process executing unit 26 (refer to step 266 of FIG. 19), and a response is transmitted to the BPEL 44 by the service receiving unit 28, after the process is completed.

When the response is received from the provider 46 and the process result is "process completion", the process executing unit 26 of the BPEL 44 generates a service ID (service ID transmitted to the package wrapper 48) of the lower service 2 by the service ID generating unit 30 (refer to step 268 of FIG. 19), calls the service calling unit 32 corresponding to the package wrapper 48, and transmits a service request to the package wrapper 48 by the service calling unit 32 corresponding to the package wrapper 48. The package wrapper 48 that has received the service request performs a process of the requested lower service 2 together with the package system 66 (refer to step 270 of FIG. 19), and a response is transmitted to the BPEL 44 by the service receiving unit 28, after the process is completed.

When the response is received from the package wrapper 48 and the process result is "process completion", the process executing unit 26 of the BPEL 44 generates a service ID (service ID transmitted to the MB wrapper 50) of the lower service 3 by the service ID generating unit 30 (refer to step 272 of FIG. 19), calls the service calling unit 32 corresponding to the MB wrapper 50, and transmits a service request to the MB wrapper 50 by the service calling unit 32 corresponding to the MB wrapper 50. The MB wrapper 50 that has received the service request performs a process of the requested lower service 3 together with the depositing system 68 (refer to step 274 of FIG. 19), and a response is transmitted to the BPEL 44 by the service receiving unit 28, after the process is completed.

In the BPEL 4, when the response is received from the package wrapper 48 and the process result is "process completion", the process result is notified from the process executing unit 26 to the service receiving unit 28. The service receiving unit 28 transmits the response to the requester 42 and notifies the process result. As a result, in the requester 42, a process that outputs the process result ("process completion") of the execution instructed service is executed (refer to step 276 of FIG. 19). As such, the service request is concatenated from the uppermost requester 42 through the BPEL 44 to the provider 46, the package wrapper 48, and the MB wrapper 50, and the instructed service is executed.

Figure 20:
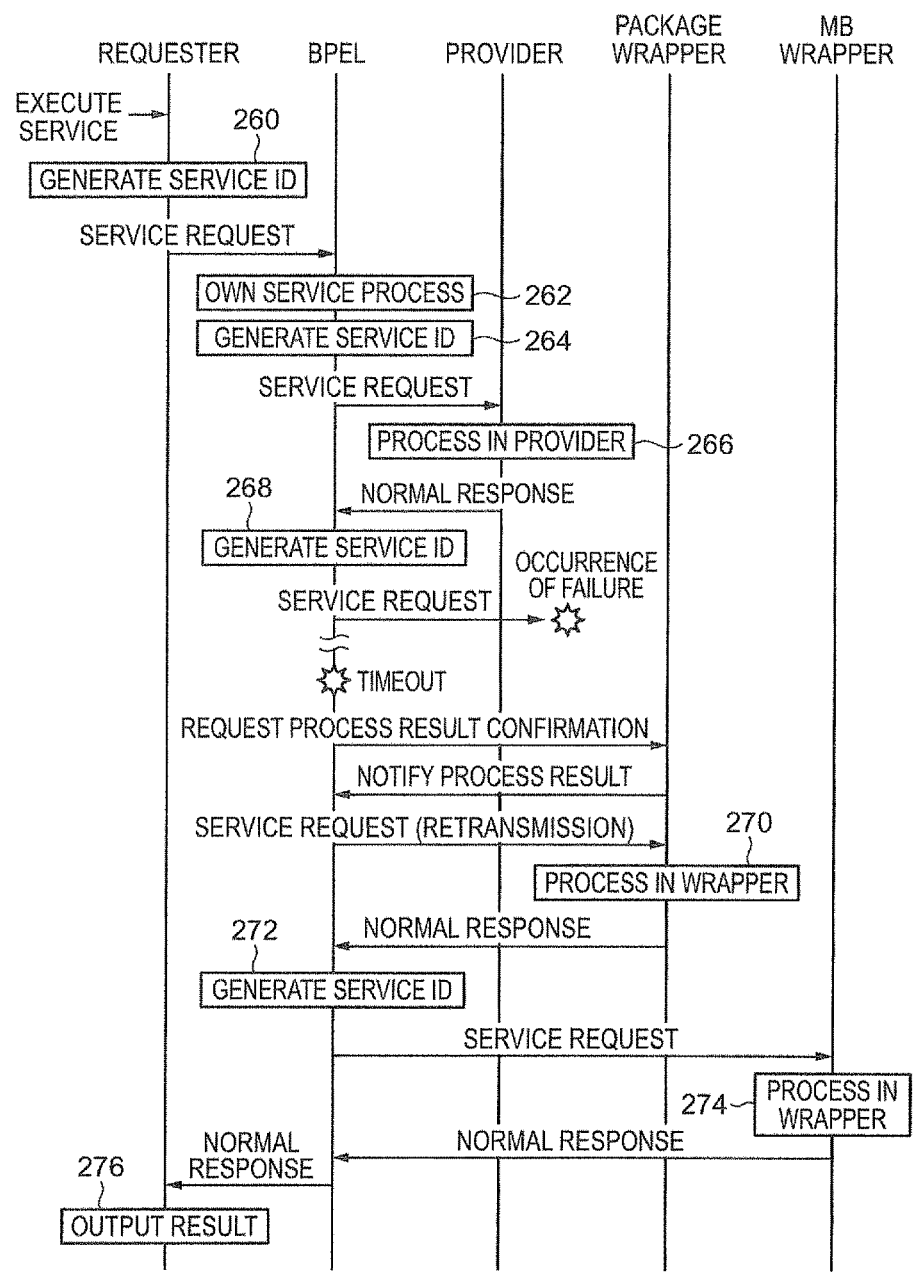
FIG. 20 is a sequence diagram illustrating another example of a sequence of a service processing system when an execution of a service is instructed.

Next, a sequence of when a failure is generated in the service processing system 10 will be described. The sequence illustrated in FIG. 20 is a sequence of when a failure is generated immediately after the BPEL 44 transmits a service request to the package wrapper 48, the transmitted service request is not received by the package wrapper 48, a response is not transmitted from the package wrapper 48, and a timer times out. In the sequence illustrated in FIG. 20, a retransmission of the service request from the BPEL 44 to the package wrapper 48 is not illustrated. However, when the service request is retransmitted to the package wrapper 48 by the predetermined number of times but a response is not received from the package wrapper 48, control is returned from the work program of the process executing unit 26 of the BPEL 44 to the process executing portion API.

In this case, the process executing portion API may notify the requester 42 of the process result of the execution requested service being "unknown" (timeout/more than the retry count) through the service receiving unit 28. However, in the sequence illustrated in FIG. 20, the process result of the lower service 2 by the package wrapper 48 is inquired to the managing unit 24. In this case, since the process result of the lower service 2 is "unknown", a process result confirmation request is transmitted from the BPEL 44 to the package wrapper 48, by the result confirmation calling unit 36 corresponding to the package wrapper 48. When the failure of the service processing system 10 is removed, the process result confirmation request is received by the package wrapper 48, and the process result of the lower service 2 that corresponds to the service ID notified by the process result confirming unit 34 of the package wrapper 48 is confirmed. In this case, since the process result is "process non-completion", a process result notification notifying that the process result is "process non-completion" is transmitted from the package wrapper 48 to the BPEL 44.

When the process result confirmation notification is received from the package wrapper 48 and it is confirmed that the process result is "process non-completion", the process executing unit 26 of the BPEL 44 calls the service calling unit 32 corresponding to the package wrapper 48, and a service request is retransmitted from the BPEL 44 to the package wrapper 48, by the service calling unit 32. Thereby, the package wrapper 48 performs a process of the requested lower service 2 together with the package system 66 (refer to step 270 of FIG. 20). Since the following sequence is the same as that in FIG. 19, the description is omitted.

Figure 21:
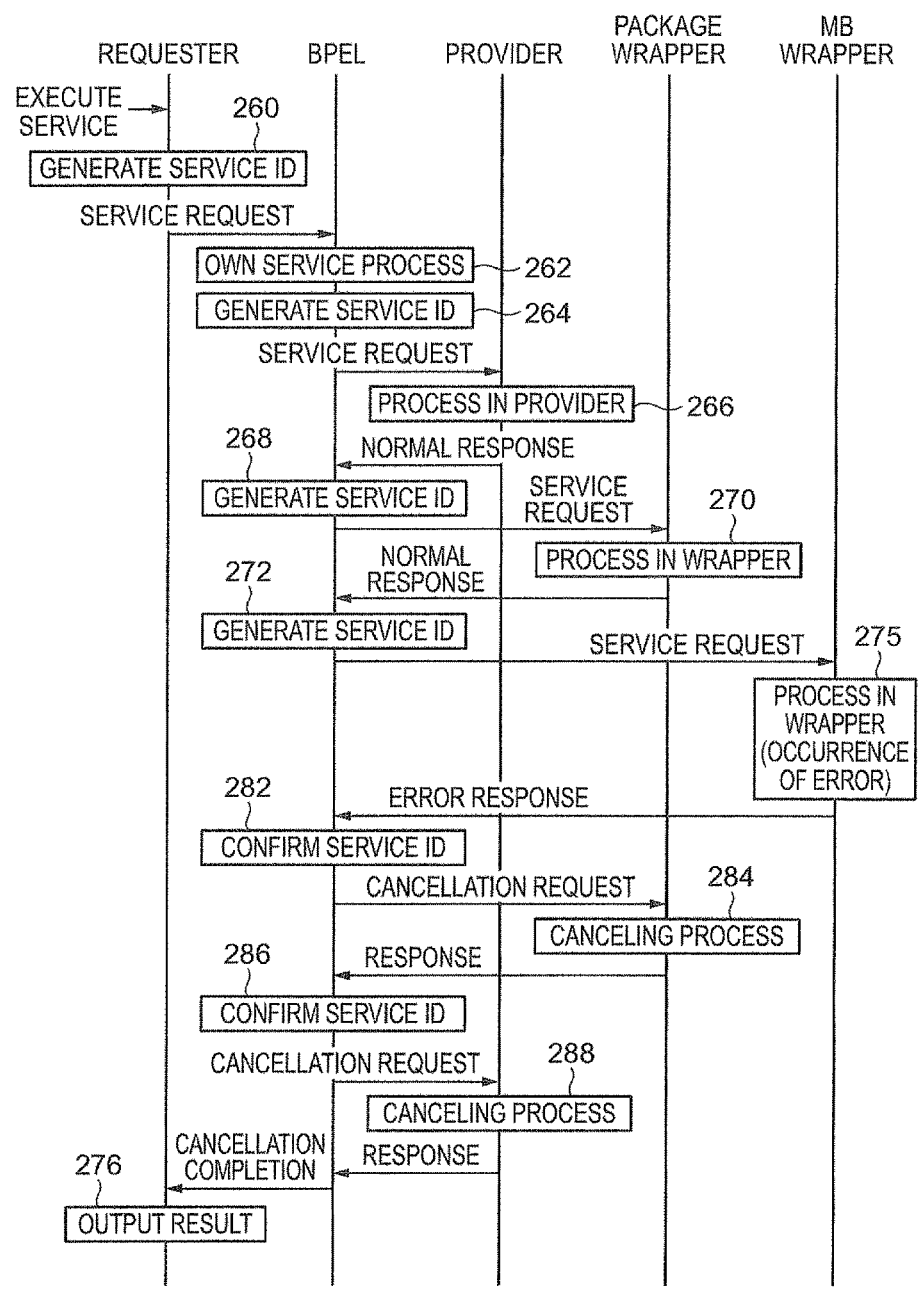
FIG. 21 is a sequence diagram illustrating another example of a sequence of a service processing system when an execution of a service is instructed.

The sequence illustrated in FIG. 21 is a sequence of when the MB wrapper 50 and the depositing system 68 cooperatively perform a process of the lower service 3 requested by the service request received from the BPEL 44 and a work error is generated as the process result (refer to step 275 of FIG. 21). In this case, a response notifying that the process result is the "work error" is transmitted from the MB wrapper 50 to the BPEL 44. If the response is received by the BPEL 44, the process executing unit 26 of the BPEL 44 performs the following process to resolve a problem of mismatch of data generated when the process result of the lower service 1 by the provider 46 and the process result of the lower service 2 by the package wrapper 48 are "process completion" and the process result of the lower service 3 by the MB wrapper 50 becomes the "work error". First, the process executing unit 26 recognizes a service ID of the corresponding lower service 2 (refer to step 282 of FIG. 21), and transmits a service request (described as "cancellation request" in FIG. 21) requesting to execute a process of canceling the process of the lower service 2 previously executed by the package wrapper 48 to the package wrapper 48 by the service calling unit 32. Thereby, the package wrapper 48 and the package system 66 cooperatively perform a process of canceling the process of the lower service 2 where the execution is normally completed (refer to step 284 of FIG. 21).

When the response with respect to the service request (cancellation request) is received from the package wrapper 48, the process executing unit 26 of the BPEL 44 recognizes a service ID of the corresponding lower service 3 (refer to step 286 of FIG. 21), and transmits a service request (described as "cancellation request" in FIG. 21) requesting to execute a process of canceling the process of the lower service 3 previously executed by the MB wrapper 50 to the MB wrapper 50 by the service calling unit 32. Thereby, the MB wrapper 50 and the depositing system 68 cooperatively perform a process of canceling the process of the lower service 3 where the execution is normally completed (refer to step 288 of FIG. 21).

When the response with respect to the service request (cancellation request) is received from the MB wrapper 50, the process executing unit 26 of the BPEL 44 notifies the service receiving unit 28 of the process result, and the service receiving unit 28 transmits the response to the requester 42 to notify the process result. Thereby, in the requester 42, a process that outputs the process result ("cancellation completion" indicating that the execution instructed service is cancelled due to generation of the work error) of the execution instructed service is executed (refer to step 276 of FIG. 19).

Figure 22:
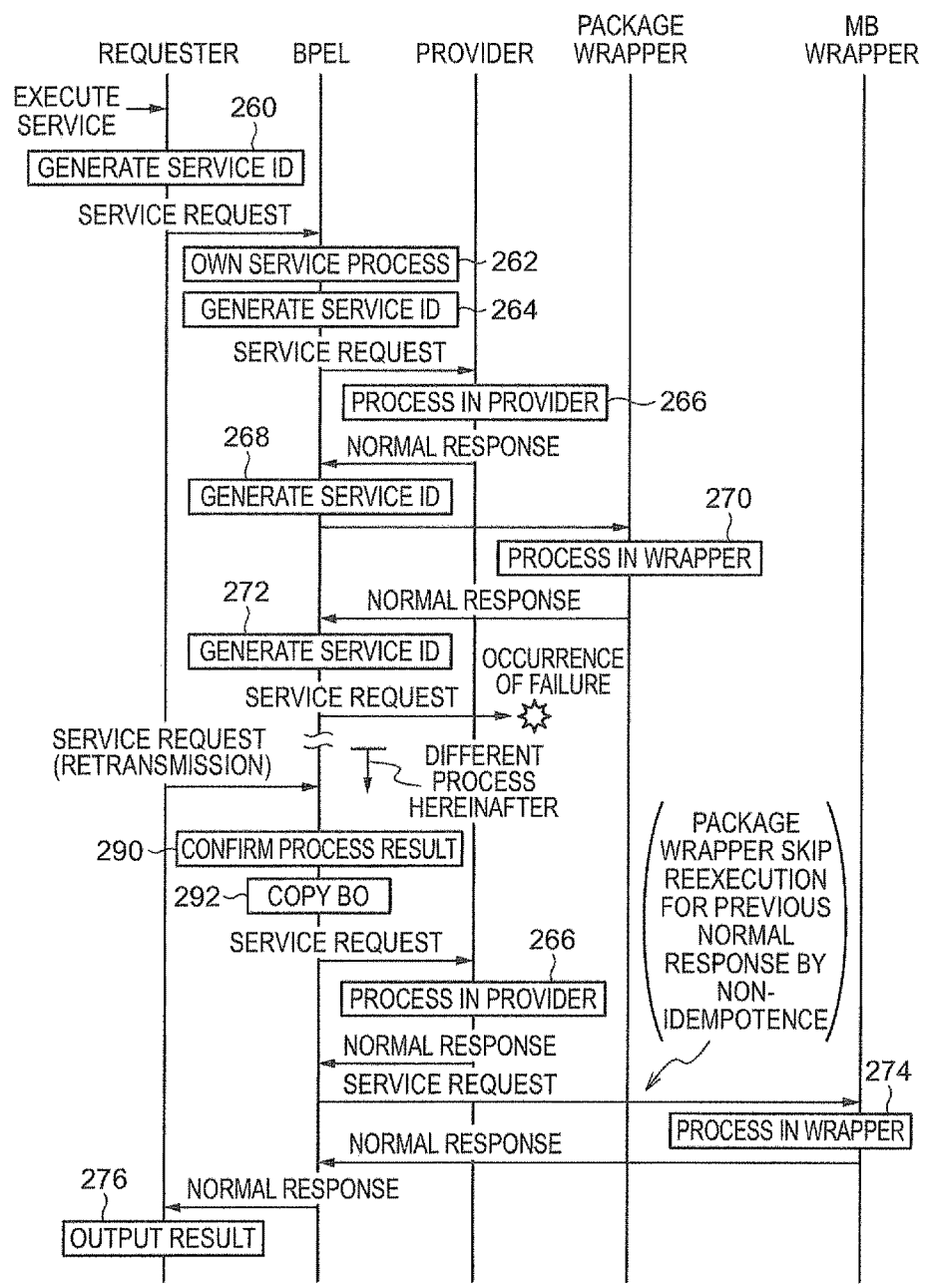
FIG. 22 is a sequence diagram illustrating an example of a sequence of a service processing system when an execution of a service is instructed plural times.

The sequence illustrated in FIG. 22 is a sequence of when a failure is generated immediately after the BPEL 44 transmits a service request to the MB wrapper 50, the transmitted service request is not received by the MB wrapper 50, a response is not transmitted from the MB wrapper 50, and the service request is retransmitted from the requester 42 to the BPEL 44. In this case, if the process executing unit 26 of the BPEL 44 has the configuration illustrated in FIG. 18, according to the reception of the service request from the requester 42, in the process executing unit 26 of the BPEL 44, a process confirming whether there is other process that is generated using the same service ID as the own process as an argument is executed (refer to step 290 of FIG. 22). From the existence of the corresponding process, it is recognized that the current service request corresponds to the retransmission of the service request received in the past.

Next, the status information that is stored in the BO of the corresponding process is copied into the BO of the own process (refer to step 292 of FIG. 22). In addition, the process to execute the service requested by the retransmitted service request is performed by the process executing unit 26. In this exemplary embodiment, however, the services that are provided by the provider 46 and the MB wrapper 50 (and the depositing system 68) have idempotence. On the other hand, the services that are provided by the package wrapper 48 (and the package system 66) do not have idempotence. Therefore, from the BPEL 44, the service request is transmitted to only the provider 46 and the MB wrapper 50, and the transmission of the service request is skipped with respect to the package wrapper 48, because the process result of the corresponding lower service becomes "process completion". Thus, the virtual idempotent function is realized.

Figure 23:
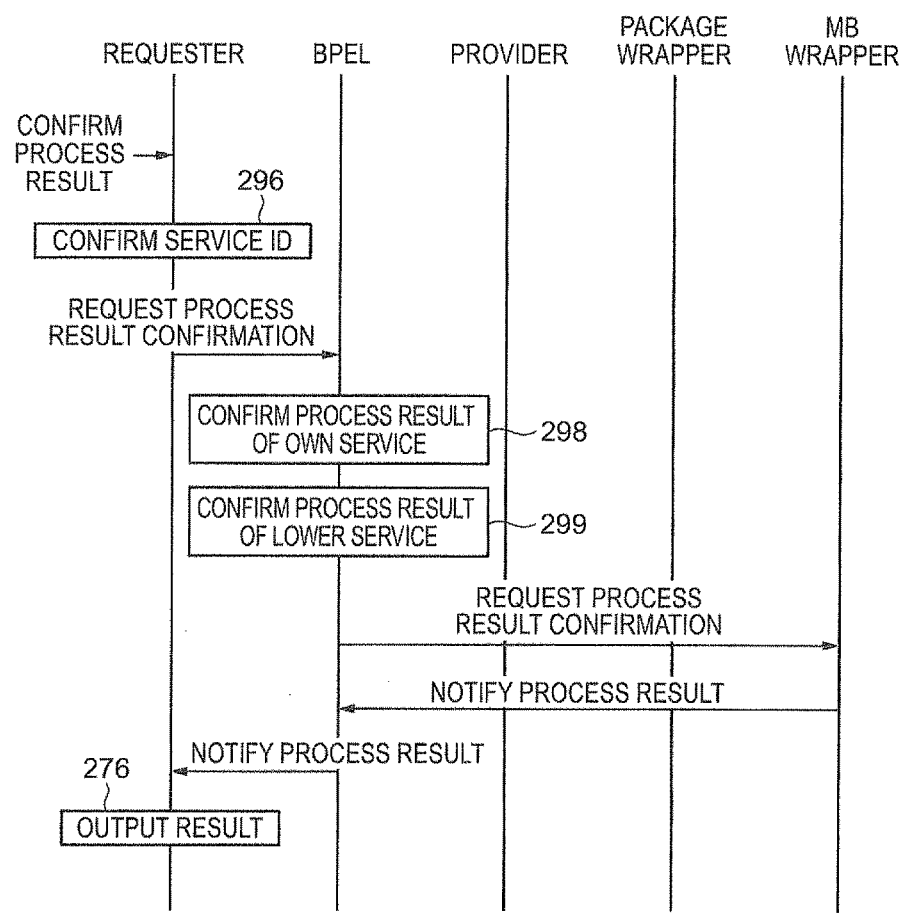
FIG. 23 is a sequence diagram illustrating an example of a sequence of a service processing system when a confirmation of a process result is instructed.

FIG. 23 illustrates an example of a sequence of when a confirmation of a process result is instructed to the requester 42. In the sequence, when a confirmation of a process result is instructed, a process result of a service of a confirmation object is confirmed by the managing unit 24 of the requester 42. If the process result is "unknown", after a service ID of the service of the confirmation object is recognized (refer to step 296 of FIG. 23), a process result confirmation request is transmitted to the BPEL 44 by the result confirmation calling unit 36 of the requester 42. In the BPEL 44 that has received the process result confirmation request from requester 42, according to the request from the process result confirming unit 34, a process result of the corresponding own service is confirmed by the managing unit 24 (refer to step 298 of FIG. 23), and a process result of the corresponding lower service is also confirmed (refer to step 298 of FIG. 23).

When a lower service having a process result of "unknown" exists in the corresponding lower service (in this case, it is assumed that the process result of the lower service provided by the MB wrapper 50 is "unknown"), the result confirmation calling unit 36 that corresponds to the lower service having the process result of "unknown" is called by the managing unit 24, and the result confirmation calling unit 36 transmits a process result confirmation request to the corresponding lower service processing unit (MB wrapper 50 in this example). When the BPEL 44 receives a process result notification from the lower service processing unit, the process result notification is transmitted to the requester 42 by the process result confirming unit 34 of the BPEL 44. Thereby, in the requester 42, a process that outputs the process result of the service where the confirmation of the process result is instructed is executed (refer to step 276 of FIG. 23). As such, even when the confirmation of the process result is instructed, the process result confirmation request is transmitted from the requester 42 to the BPEL 44, the process result confirmation request is concatenated to the lower service processing unit, if necessary, and the process result of the instructed service is confirmed.

In the above description, the service processing system 10 having the configuration where the five service processing units are divided into three layers (three stages), the three service processing units of the third layer (third stage) are connected to the single service processing unit of the second layer (second stage), and the single service processing unit of the second layer (second stage) is connected to the single service processing unit of the first layer (first stage) has been exemplified as the service processing system in the invention. However, the number of the service processing units or the number of stages and the number of service processing units in each stage (each layer) are not limited to the above-described example. For example, the invention may be applied to a service processing system having the configuration where service processing units are connected with plural stages.

In the above description, the service processing program for realizing the service processing unit of the second stage (second layer) is operated on the platform of the BPEL, however, the invention is not limited thereto. The service processing system in the invention may be constructed without using the BPEL.

In the above description, each service processing unit is realized by the different computer (service processing server 12), however, the invention is not limited thereto. The invention may be applied to an aspect where a single computer functions as each of different kinds of service processing units.

In the above description, the service processing program corresponding to the program according to the invention is previously stored (installed) in the storage unit 12C of the service processing server 12. However, as another aspect, the program according to the invention may be recorded in a recording medium, such as a CD-ROM or a DVD-ROM, and may be provided. The recording medium according to this aspect corresponds to the recording medium according to the invention.

A first aspect of the invention is a service processing apparatus that is realized by a computer and forms a service processing system, and transmits and receives information, with at least one other service processing apparatus, the service processing apparatus comprising: a processing component that processes an own service corresponding to a service for which execution is requested when execution of the service is requested, and transmits a service request, which requests a lower service processing apparatus to execute a lower service, to the lower service processing apparatus, when the lower service needs to be executed by the lower service processing apparatus; an ID element generating component that generates an ID element including a unique ID in which a different ID is set for each service processing apparatus and a request ID in which a different ID is set for each service request; and a service ID generating/adding component that generates a service ID including a call origin ID and a call destination ID, in each of which the ID element generated by the ID element generating component is set, and adds the generated service ID to a service request transmitted by the processing component when no upper service processing apparatus to the own apparatus exists, and, when an upper service processing apparatus to the own apparatus exists, generates a service ID including a call origin ID in which is set an ID element set as the call destination ID in a service ID added to a service request received from the upper service processing apparatus and a call destination ID in which is set an ID element generated by the ID element generating component and adds the generated service ID to the service request transmitted by the processing component.

The service processing apparatus according to the first aspect is realized by the computer, and constitutes the service processing system with another service processing apparatus that can exchange information with the service processing apparatus. The typical configuration of the service processing system is the configuration where each service processing apparatus is realized by a different computer, however, the configuration may be the configuration where a portion or all of the service processing apparatuses are realized by the same computer. The service processing apparatus according to the invention includes a processing component configured to perform a process of an own service corresponding to an execution requested service, when the execution of the service is requested, and transmit a service request, which requests a lower service processing apparatus to execute a lower service, to the lower service processing apparatus, when the lower service needs to be executed by the lower service processing apparatus, and an ID element generating component configured to generate an ID element including a unique ID where a different ID is set for each service processing apparatus and a request ID where a different ID is set for each service request. When each service processing apparatus is realized by the different computer, an ID of the computer (computer functioning as the service processing apparatus) for realizing the service processing apparatus may be applied as the "ID different for each service processing apparatus".

As such, the ID element is configured to include the unique ID where the different ID (the ID of the service processing apparatus or the ID of the computer functioning as the service processing apparatus) is set for each service processing apparatus. In the ID element that is generated by the ID element generating component, uniqueness with at least the service processing apparatus (ID element generating component) as a unit is secured. Further, the ID element is configured to include the request ID where the different ID is set for each service request. In the ID element that is generated by the ID element generating component, uniqueness with each service request in the service processing apparatus (ID element generating component) as a unit is secured. Accordingly, in each ID element that is generated by each ID element generating component included in each service processing apparatus, uniqueness in the service processing system is secured (non-overlapping with another ID element is ensured).

As such, the ID element generating component that is included in the service processing apparatus according to the invention sets the ID different for each service processing apparatus to the unique ID of the ID element and sets the ID different for each service request to the request ID of the ID element, and the ID element where uniqueness in the service processing system is secured may be generated. Therefore, even when the invention is applied to the individual service processing apparatus constituting the service processing system, a numbering process accompanied with exclusive control does not need to be performed to generate the ID element (service ID) where the uniqueness is secured, and performance of the service processing system according to the invention may be prevented from being greatly lowered due to the numbering process accompanied with the exclusive control.

In the first aspect, the service processing apparatus further includes a service ID generating/adding component configured to generate a service ID including a call origin ID and a call destination ID where the ID element generated by the ID element generating component is set (ID element set to the call origin ID and the call destination ID of the same service ID may be the same or different) and add the generated service ID to a service request transmitted by the processing component, when there is no upper service processing apparatus of the own apparatus, and generate a service ID including a call origin ID where the ID element set as the call destination ID in the service ID added to the service request received from the upper service processing apparatus is set and a call destination ID where the ID element generated by the ID element generating component is set and add the generated service ID to the service request transmitted by the processing component, when there is the upper service processing apparatus of the own apparatus.

When the service processing apparatus according to the invention is a service processing apparatus (uppermost service processing apparatus where the execution of the service is first requested) of which upper service processing apparatus does not exist, the service ID where the ID element generated by the ID element generating component is set to each of the call origin ID and the call destination ID is generated by the service ID generating/adding component of the service processing apparatus, and is added to the transmitted service request. When the service processing apparatus according to the invention is a service processing apparatus (service processing apparatus after the service processing apparatus of the second stage (second layer) where the execution of the service is requested from the upper service processing apparatus) of which upper service processing apparatus exists, by the service ID generating/adding component of the service processing apparatus, the ID element set as the call destination ID in the service ID added to the received service request is set to the call origin ID. The service ID where the ID element generated by the ID element generating component is set to the call destination ID is generated and is added to the transmitted second service request. Therefore, the call destination ID in the service ID that is added to the service request received from the upper service processing apparatus becomes matched with the call origin ID in the service ID that is added to the service request transmitted to the lower service processing apparatus.

Accordingly, when the invention is applied to the individual service processing apparatuses constituting the service processing system, a failure is generated in the service processing system, and plural service requests of process non-completion states where the execution of the processes is interrupted due to the generation of the failure remain in any service processing apparatus among the plural service processing apparatuses, the service processing apparatus that has transmitted the remaining service requests may be identified from the certain ID element set as the call origin ID in the service ID added to the remaining service requests. The service request that includes the service ID where the certain ID element is set as the call destination ID is searched from the service requests received by the identified service processing apparatus, and service requests corresponding to the remaining service requests may be extracted. If this process is repeated, the service processing system may grasp a process history of the service corresponding to the service request of the process non-completion state where the execution of the process is interrupted due to the generation of the failure, even though the service processing apparatus according to the invention are connected with multiple stages.

As such, in the first aspect, the process history of the service corresponding to each service request is registered in the single managing table, and the process history of the service corresponding to the service request of the process non-completion state where the execution of the process is interrupted due to the generation of the failure may be grasped without performing a process that causes lowering of performance of the service processing system. Accordingly, according to the first aspect, when the failure is generated, the process history of the requested service may be grasped while performance is suppressed from being lowered.

In the first aspect, the service ID may be configured to include the original ID. In this case, the service ID generating/adding component may be configured to generate a service ID including an origin ID where the ID element generated by the ID element generating component is set, when there is no upper service processing apparatus of the own apparatus (when the service processing apparatus according to the invention is the uppermost service processing apparatus), and generate a service ID including an original ID where the ID element set as the original ID in the service ID added to the service request received is set, when there is the upper service processing apparatus of the own apparatus and the corresponding service processing apparatus is a service processing apparatus whose upper service processing apparatus exists (when the service processing apparatus according to the invention is the service processing apparatus after the service processing apparatus of the second stage (second layer).

By this configuration, when the service processing apparatus according to the invention is the uppermost service processing apparatus, in the service request transmitted from the service processing apparatus, as the original ID, the service ID where the ID element (ID element set to the original ID may be equal to or different from the ID element set as the call origin ID or the call destination ID of the same service ID) generated by the ID element generating component of the uppermost service processing apparatus is set is added. When the service processing apparatus according to the invention is the service processing apparatus after the service processing apparatus of the second stage (second layer), in the service request that is transmitted from the corresponding service processing apparatus, the service ID where the same ID element as the original ID of the service ID added to the received service request is set as the original ID is added.

When the invention is applied to the individual service processing apparatus constituting the service processing system, since the service ID that is added to the corresponding service request has the same original ID, the corresponding service request may be identified based on whether the original IDs of the service IDs added to the individual service requests are the same. Accordingly, even when the service processing apparatuses constituting the service processing system are partially downed, the information of the service request is lost in the down service processing apparatus, and it is difficult to search the same service request based on the ID element set to the call origin ID and the call destination ID of the service ID, the process history of the requested service may be securely grasped by referring to the original ID.

In the first aspect, for example, the service ID generating/adding component stores the generated service ID in the storage component provided in the computer for realizing the own apparatus, whenever the service ID is generated. When the processing component receives the service request corresponding to the service request where the generated service ID is added from the upper service processing apparatus, preferably, the service ID generating/adding component associates the service ID added to the received service request and stores the service ID. In the service processing apparatus according to the invention, when the processing component receives the service request from the upper service processing apparatus, the service according to the received service request is a service needing the execution of the lower service, and the service request requesting the execution of the lower service is transmitted to the lower service processing apparatus, the service ID added to the received service request and the service ID added to the transmitted service request are associated with each other and stored in the storage component. As a result, the process of grasping the process history of the requested service may be easily performed.

In the first aspect, for example, the ID element generating component is preferably configured to generate the ID element including the execution unit ID given to the execution unit of the program for causing the computer to perform a function as the service processing apparatus. The execution unit may be any one of a process, a task, and a thread, for example. Even when plural execution units exist in the single computer, a service ID (at least an execution unit ID) that is added to the service request becomes different depending on each execution unit (service processing apparatus). By referring to the execution unit ID among the service IDs added to the service request, an execution unit (service processing apparatus) by which the corresponding service request is processed among the execution units of the plural service processing apparatuses may be determined.

In the first aspect, for example, the processing component may be configured to retransmit the service request when a normal response is not transmitted from the lower service processing apparatus transmitting the service request, and the ID information generating/adding component may be configured to add the same service ID as the previous service ID at the time of retransmitting the service request.

In a service processing system according to a second aspect of the invention, the plural service processing apparatus according to the first aspect are provided to exchange information with each other. Therefore, similar to the first aspect, when a failure is generated, a process history of a service request may be grasped while performance is suppressed from being lowered.

A third aspect of the invention is a storage medium readable by a computer, the storage medium storing a program of instructions executable by the computer to perform a function as a service processing apparatus forming a service processing system, and transmits and receives information, with at least one other service processing apparatus, the function comprising: a processing component that processes an own service corresponding to a service for which execution is requested, when execution of the service is requested, and transmits a service request, which requests a lower service processing apparatus to execute a lower service, to the lower service processing apparatus, when the lower service needs to be executed by the lower service processing apparatus; an ID element generating component that generates an ID element including a unique ID in which a different ID is set for each service processing apparatus and a request ID in which a different ID is set for each service request; and a service ID generating/adding component that generates a service ID including a call origin ID and a call destination ID in which the ID element generated by the ID element generating component is set and adds the generated service ID to a service request transmitted by the processing component, when no upper service processing apparatus to the own apparatus exists, and when an upper service processing apparatus to the own apparatus exists, generates a service ID including a call origin ID in which is set an ID element set as the call destination ID in a service ID added to a service request received from the upper service processing apparatus and a call destination ID in which is set an ID element generated by the ID element generating component and adds the generated service ID to the service request transmitted by the processing component.

Since a recording medium according to the third aspect records a service processing program for causing a computer to perform a function as each of the processing component, the ID element generating component, and the service ID generating/adding component, the computer reads the service processing program from the recording medium according to the third aspect and executes the service processing program, and the computer functions as the service processing apparatus according to the first aspect. Accordingly, similar to the first aspect, when a failure is generated, a process history of a service request may be grasped while performance is suppressed from being lowered.

As described above, the service processing apparatus includes the ID element generating component configured to generate an ID element including a unique ID where a different ID is set for each service processing apparatus and a request ID where a different ID is set for each service request and the service ID generating/adding component configured to generate a service ID including a call origin ID and a call destination ID where the ID element generated by the ID element generating component is set and add the generated service ID to a service request transmitted, when there is no upper service processing apparatus of the own apparatus, and generate a service ID including a call origin ID where the ID element set as the call destination ID in the service ID added to the service request received from the upper service processing apparatus is set and a call destination ID where the ID element generated by the ID element generating component is set and add the generated service ID to the service request transmitted, when there is the upper service processing apparatus of the own apparatus. Accordingly, when a failure is generated, a process history of the requested service may be grasped while performance is suppressed from being lowered.

What is claimed is:

1. A service processing apparatus that includes a computer, the computer including a storage component and at least one processor such that components stored in the storage component and executed by the at least one processor are performed by the computer, and forms a service processing system, and transmits and receives information with at least one other service processing apparatus, the service processing apparatus comprising:

a processing component stored in the storage component and executed by the at least one processor that processes an own service corresponding to a service for which execution is requested when execution of the service is requested, and transmits a service request, which requests a lower service processing apparatus to execute a lower service, to the lower service processing apparatus, when the lower service needs to be executed by the lower service processing apparatus;

an ID element generating component stored in the storage component and executed by the at least one processor that generates an ID element including a unique ID in which a different ID is set for each service processing apparatus and a request ID in which a second different ID is set for each service request; and a service ID generating/adding component stored in the storage component and executed by the at least one processor that generates a service ID including a call origin ID and a call destination ID, in each of which the ID element generated by the ID element generating component is set, and adds the generated service ID to the service request transmitted by the processing component when no upper service processing apparatus to the own apparatus exists, and, when the upper service processing apparatus to the own apparatus exists, generates the service ID including a call origin ID that is set as the call destination ID in a service ID added to a service request received from the upper service processing apparatus and a call destination ID that is set by the ID element generating component and adds the generated service ID to the service request transmitted by the processing component.

2. The service processing apparatus of claim 1, wherein, when no upper service processing apparatus of the own apparatus exists, the service ID generating/adding component generates the service ID further including an original ID set by the ID element generating component, and when the upper service processing apparatus of the own apparatus exists, the service ID generating/adding component generates the service ID further including the original ID that is set as the original ID in the service ID added to the service request received from the upper service processing apparatus.

3. The service processing apparatus of claim 1, wherein, whenever the service ID is generated, the service ID generating/adding component stores the generated service ID in the storage component provided in the computer for realizing the own apparatus, and when the processing component receives a service request to which the generated service ID is added from the upper service processing apparatus, the service ID generating/adding component associates the added service ID with the received service request and stores the service ID.

4. The service processing apparatus of claim 1, wherein the ID element generating component generates the ID element further including an execution unit ID that is provided to an execution unit of a program for causing the computer to perform a function as the service processing apparatus.

5. The service processing apparatus of claim 1, wherein:
when a normal response is not received from the lower service processing apparatus to which the service request has been transmitted, the processing component retransmits the service request; and
the ID information generating/adding component adds the same service ID as a previous service ID when the service request is retransmitted.

6. A service processing system comprising:
a service processing apparatus that includes a computer, the computer including a storage component and at least one processor such that components stored in the storage component and executed by the at least one processor are performed by the computer, and forms a service processing system, and transmits and receives information with at least one other service processing apparatus, the service processing apparatus comprising:
a processing component stored in the storage component and executed by the at least one processor that processes an own service corresponding to a service for which execution is requested when execution of the service is requested, and transmits a service request, which requests a lower service processing apparatus to execute a lower service, to the lower service processing apparatus, when the lower service needs to be executed by the lower service processing apparatus;

an ID element generating component stored in the storage component and executed by the at least one processor that generates an ID element including a unique ID in which a different ID is set for each service processing apparatus and a request ID in which a second different ID is set for each service request; and a service ID generating/adding component stored in the storage component and executed by the at least one processor that generates a service ID including a call origin ID and a call destination ID, in each of which the ID element generated by the ID element generating component is set, and adds the generated service ID to the service request transmitted by the processing component when no upper service processing apparatus to the own apparatus exists, and, when the upper service processing apparatus to the own apparatus exists, generates the service ID including a call origin ID that is set as the call destination ID in a service ID added to a service request received from the upper service processing apparatus and a call destination ID that is set by the ID element generating component and adds the generated service ID to the service request transmitted by the processing component, wherein a plurality of the service processing apparatuses transmit and receive information with each other.

7. A non-transitory computer-readable medium storing a program of instructions executable by the computer to perform a function as a service processing apparatus forming a service processing system, and transmits and receives information with at least one other service processing apparatus, the instructions comprising:
a processing component that processes an own service corresponding to a service for which execution is requested, when execution of the service is requested, and transmits a service request, which requests a lower service processing apparatus to execute a lower service, to the lower service processing apparatus, when the lower service needs to be executed by the lower service processing apparatus;

an ID element generating component that generates an ID element including a unique ID in which a different ID is set for each service processing apparatus and a request ID in which a second different ID is set for each service request; and a service ID generating/adding component that generates a service ID including a call origin ID and a call destination ID in which the ID element generated by the ID element generating component is set and adds the generated service ID to the service request transmitted by the processing component when no upper service processing apparatus to the own apparatus exists, and when the upper service processing apparatus to the own apparatus exists, generates the service ID including a call origin ID that is set as the call destination ID in a service ID added to a service request received from the upper service processing apparatus and a call destination ID that is set by the ID element generating component and adds the generated service ID to the service request transmitted by the processing component.

* * * * *